(12) United States Patent
Hirano et al.

(10) Patent No.: US 6,961,474 B1
(45) Date of Patent: Nov. 1, 2005

(54) HUFFMAN ENCODER FOR ENCODING/DECODING DCT COEFFICIENTS

(75) Inventors: Kenji Hirano, Sakai (JP); Shinji Kitamura, Nagaokakyo (JP); Tatsuhiko Murata, Kyoto (JP)

(73) Assignee: Shikino High-Tech Co., Ltd., Toyama (JP)

( * ) Notice: Subject to any disclaimer, the term of this patent is extended or adjusted under 35 U.S.C. 154(b) by 0 days.

(21) Appl. No.: 09/622,424

(22) PCT Filed: Feb. 24, 1999

(86) PCT No.: PCT/JP99/00860

§ 371 (c)(1),
(2), (4) Date: Jun. 27, 2001

(87) PCT Pub. No.: WO99/44368

PCT Pub. Date: Sep. 2, 1999

(30) Foreign Application Priority Data

Feb. 27, 1998 (JP) ................................. 10/046478
Mar. 5, 1998 (JP) ................................. 10/054017
Apr. 22, 1998 (JP) ................................. 10/112465

(51) Int. Cl.⁷ .......................... G06K 9/36; H03M 7/40
(52) U.S. Cl. ..................... 382/246; 382/245; 341/67
(58) Field of Search ................. 382/246, 232, 382/244, 245; 358/426.12, 426.13, 426.14, 358/426.04, 539; 341/67, 63; 375/240.23, 375/240.24, 246, 253

(56) References Cited

U.S. PATENT DOCUMENTS

| | | | | |
|---|---|---|---|---|
| 5,233,348 A | | 8/1993 | Pollmann et al. ............. 341/67 |
| 5,363,097 A | * | 11/1994 | Jan ............................... 341/67 |
| 5,379,070 A | * | 1/1995 | Retter et al. ........... 375/240.02 |
| 5,497,153 A | | 3/1996 | Jeong ........................... 341/67 |
| 5,694,127 A | | 12/1997 | Tayama ........................ 341/67 |
| 5,764,357 A | * | 6/1998 | Dockser ...................... 382/246 |
| 5,801,979 A | | 9/1998 | Phillips ....................... 708/670 |
| 5,818,363 A | * | 10/1998 | Kim .............................. 341/63 |
| 5,828,425 A | * | 10/1998 | Kim ....................... 375/240.26 |
| 5,832,128 A | * | 11/1998 | Suzuki ....................... 382/246 |
| 5,973,744 A | * | 10/1999 | Kim ....................... 375/240.24 |
| 6,055,272 A | * | 4/2000 | Kim ....................... 375/240.23 |

FOREIGN PATENT DOCUMENTS

| EP | 580454 | 1/1994 | ............ H04N 7/13 |
|---|---|---|---|
| JP | 61-226881 | 10/1986 | ............ G06F 15/64 |
| JP | 62-92051 | 4/1987 | ............ G06F 13/16 |
| JP | 62-205452 | 9/1987 | ............ G06F 12/06 |
| JP | 62-241045 | 10/1987 | ............ G06F 12/00 |
| JP | 62-288980 | 12/1987 | ............ G06F 15/62 |
| JP | 1-240985 | 9/1989 | ............ G06F 15/66 |
| JP | 3-237887 | 10/1991 | ............ H04N 7/133 |
| JP | 4-192744 | 7/1992 | ............ H04L 25/497 |
| JP | 4-330828 | 11/1992 | ............ H03M 7/30 |
| JP | 6-104768 | 4/1994 | ............ H03M 7/40 |
| JP | 6-113289 | 4/1994 | ............ H04N 7/137 |

(Continued)

*Primary Examiner*—Wenpeng Chen
(74) *Attorney, Agent, or Firm*—Morgan & Finnegan, LLP

(57) ABSTRACT

An apparatus for processing a block of image data at a high speed, in which two items of data consecutive in data scan are simultaneously written in different memories and are processed as a set of data having a valid portion and an invalid portion and in which the subsequent process is differentiated depending on the frequency of occurrence of the data to suppress any increase in the scale of the circuit and to increase the speed of the same.

16 Claims, 31 Drawing Sheets

FOREIGN PATENT DOCUMENTS

| | | | | |
|---|---|---|---|---|
| JP | 6-125278 | 5/1994 | ........... | H03M 7/46 |
| JP | 6-139346 | 5/1994 | ........... | G06F 15/66 |
| JP | 6-274524 | 9/1994 | ......... | G06F 15/332 |
| JP | 7-143013 | 6/1995 | ........... | H03M 9/00 |
| JP | 8-137830 | 5/1996 | ........... | G06F 17/10 |
| JP | 9-154133 | 6/1997 | ........... | H04N 7/30 |
| JP | 9-162749 | 6/1997 | ........... | H03M 7/40 |
| JP | 9-198372 | 7/1997 | ........... | G06F 17/14 |
| JP | 9-246988 | 9/1997 | ........... | H03M 7/40 |
| JP | 9-246989 | 9/1997 | ........... | H03M 7/40 |
| JP | 9-261643 | 10/1997 | ........... | H04N 7/30 |
| JP | 10-65550 | 3/1998 | ........... | H03M 7/42 |
| JP | 10-191334 | 7/1998 | ........... | H03M 7/30 |
| KR | 9510913 | 9/1995 | ........... | H03M 7/00 |

\* cited by examiner

|    |    |    |    |    |    |    |    |
|----|----|----|----|----|----|----|----|
| 0  | 1  | 2  | 3  | 4  | 5  | 6  | 7  |
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

*FIG. 2(a)*

|    |    |    |    |    |    |    |    |
|----|----|----|----|----|----|----|----|
| 0  | 1  | 2  | 3  | 4  | 5  | 6  | 7  |
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

| 0 | 8 | 16 | 24 | 32 | 40 | 48 | 56 |
|---|---|----|----|----|----|----|----|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

FIG. 3(a)

| 0 | 8 | 16 | 24 | 32 | 40 | 48 | 56 |
|---|---|----|----|----|----|----|----|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

FIG. 3(b)

|   |   |   |   |   |   |   |   |
|---|---|---|---|---|---|---|---|
| 0 | 8 | 16 | 24 | 32 | 40 | 48 | 56 |
| 9 | 1 | 25 | 17 | 41 | 33 | 57 | 49 |
| 2 | 10 | 18 | 26 | 34 | 42 | 50 | 58 |
| 11 | 3 | 27 | 19 | 43 | 35 | 59 | 51 |
| 4 | 12 | 20 | 28 | 36 | 44 | 52 | 60 |
| 13 | 5 | 29 | 21 | 45 | 37 | 61 | 53 |
| 6 | 14 | 22 | 30 | 38 | 46 | 54 | 62 |
| 15 | 7 | 31 | 23 | 47 | 39 | 63 | 55 |

| | | | | |
|---|---|---|---|---|
| 0 | 0 | 16 | 32 | 48 |
| 4 | 9 | 25 | 41 | 57 |
| 8 | 2 | 18 | 34 | 50 |
| 12 | 11 | 27 | 43 | 59 |
| 16 | 4 | 20 | 36 | 52 |
| 20 | 13 | 29 | 45 | 61 |
| 24 | 6 | 22 | 38 | 54 |
| 28 | 15 | 31 | 47 | 63 |

2

| | | | | |
|---|---|---|---|---|
| 0 | 8 | 24 | 40 | 56 |
| 4 | 1 | 17 | 33 | 49 |
| 8 | 10 | 26 | 42 | 58 |
| 12 | 3 | 19 | 35 | 51 |
| 16 | 12 | 28 | 44 | 60 |
| 20 | 5 | 21 | 37 | 53 |
| 24 | 14 | 30 | 46 | 62 |
| 28 | 7 | 23 | 39 | 55 |

FIG. 3(d)

| WRITE DATA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| MEMORY 1 WRITE ADDRESS | (0) | | (2) | | (3) | | (4) | | (5) | | (6) | | (7) | | (8) | | (9) | | (10) | | (11) | | (12) | | (13) | | (14) | | (15) | |
| MEMORY 1 DATA | 0 | | 4 | | 6 | | 9 | | 11 | | 13 | | 15 | | 16 | | 18 | | 20 | | 22 | | 25 | | 27 | | 29 | | 31 | |
| MEMORY 2 WRITE ADDRESS | (0) | | (2) | | (3) | | (4) | | (5) | | (6) | | (7) | | (8) | | (9) | | (10) | | (11) | | (12) | | (13) | | (14) | | (15) | |
| MEMORY 2 DATA | 1 | | 5 | | 7 | | 8 | | 10 | | 12 | | 14 | | 17 | | 19 | | 21 | | 23 | | 24 | | 26 | | 28 | | 30 | |

| WRITE DATA | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| MEMORY 1 WRITE ADDRESS | (16) | | (18) | | (19) | | (20) | | (21) | | (22) | | (23) | | (24) | | (25) | | (26) | | (27) | | (28) | | (29) | | (30) | | (31) | |
| MEMORY 1 DATA | 32 | | 36 | | 38 | | 41 | | 43 | | 45 | | 47 | | 48 | | 50 | | 52 | | 54 | | 57 | | 59 | | 61 | | 63 | |
| MEMORY 2 WRITE ADDRESS | (16) | | (18) | | (19) | | (20) | | (21) | | (22) | | (23) | | (24) | | (25) | | (26) | | (27) | | (28) | | (29) | | (30) | | (31) | |
| MEMORY 2 DATA | 33 | | 37 | | 39 | | 40 | | 42 | | 44 | | 46 | | 49 | | 51 | | 53 | | 55 | | 56 | | 58 | | 60 | | 62 | |

1ST, 3RD, 5TH, 7TH ROWS: UNCHANGED
2ND, 4TH, 6TH, 8TH ROWS: SHIFTED ONE PLACE
FIG. 6(a)   FIG. 6(b)   FIG. 6(c)

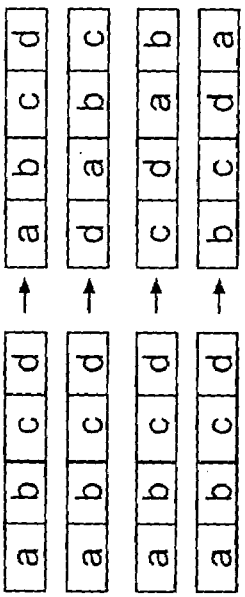
1ST, 5TH ROWS: UNCHANGED
2ND, 6TH ROWS: SHIFTED ONE PLACE
3RD, 7TH ROWS: SHIFTED TWO PLACES
4TH, 8TH ROWS: SHIFTED THREE PLACES
*FIG. 7(a)*     *FIG. 7(b)*     *FIG. 7(c)*

FIG. 8(a)

| | | | | | | | |
|---|---|---|---|---|---|---|---|
|0|1|2|3|4|5|6|7|
|8|9|10|11|12|13|14|15|
|16|17|18|19|20|21|22|23|
|24|25|26|27|28|29|30|31|
|32|33|34|35|36|37|38|39|
|40|41|42|43|44|45|46|47|
|48|49|50|51|52|53|54|55|
|56|57|58|59|60|61|62|63|

1ST ROW: UNCHANGED
2ND ROW: SHIFTED ONE PLACE
3RD ROW: SHIFTED TWO PLACES
4TH ROW: SHIFTED THREE PLACES
5TH ROW: SHIFTED FOUR PLACES
6TH ROW: SHIFTED FIVE PLACES
7TH ROW: SHIFTED SIX PLACES
8TH ROW: SHIFTED SEVEN PLACES

FIG. 8(b)

| B0 | B1 | B2 | B3 | B4 | B5 | B6 | B7 |
|---|---|---|---|---|---|---|---|
|0|1|2|3|4|5|6|7|
|15|8|9|10|11|12|13|14|
|22|23|16|17|18|19|20|21|
|29|30|31|24|25|26|27|28|
|36|37|38|39|32|33|34|35|
|43|44|45|46|47|40|41|42|
|50|51|52|53|54|55|48|49|
|57|58|59|60|61|62|63|56|

| a | b | c | d | e | f | g | h |
| a | b | c | d | e | f | g | h |
| a | b | c | d | e | f | g | h |
| a | b | c | d | e | f | g | h |
| a | b | c | d | e | f | g | h |
| a | b | c | d | e | f | g | h |
| a | b | c | d | e | f | g | h |
| a | b | c | d | e | f | g | h |

FIG. 8(c)

| B0 | B1 | B2 | B3 | B4 | B5 | B6 | B7 |
|---|---|---|---|---|---|---|---|
|0|8|16|24|32|40|48|56|
|57|1|9|17|25|33|41|49|
|50|58|2|10|18|26|34|42|
|43|51|59|3|11|19|27|35|
|36|44|52|60|4|12|20|28|
|29|37|45|53|61|5|13|21|
|22|30|38|46|54|62|6|14|
|15|23|31|39|47|55|63|7|

| a | b | c | d | e | f | g | h |
| h | a | b | c | d | e | f | g |
| g | h | a | b | c | d | e | f |
| f | g | h | a | b | c | d | e |
| e | f | g | h | a | b | c | d |
| d | e | f | g | h | a | b | c |
| c | d | e | f | g | h | a | b |
| b | c | d | e | f | g | h | a |

|   |   |   |   |   |   |   |   |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

|    |    |    |    |    |    |    |    |    |
|----|----|----|----|----|----|----|----|----|
| 0  | 0  | 9  | 10 | 11 | 12 | 5  | 6  | 7  |
| 8  | 16 | 17 | 26 | 27 | 28 | 29 | 30 | 23 |
| 16 | 32 | 41 | 42 | 43 | 44 | 45 | 38 | 39 |
| 24 | 48 | 49 | 50 | 59 | 60 | 61 | 62 | 55 |

|    |    |    |    |    |    |    |    |    |
|----|----|----|----|----|----|----|----|----|
| 0  | 8  | 1  | 2  | 3  | 4  | 13 | 14 | 15 |
| 8  | 24 | 25 | 18 | 19 | 20 | 21 | 22 | 31 |
| 16 | 40 | 33 | 34 | 35 | 36 | 37 | 46 | 47 |
| 24 | 56 | 57 | 58 | 51 | 52 | 53 | 54 | 63 |

|  |  |  |  |  |  |  |  |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 17 | 18 | 19 | 20 | 21 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 12(a)

|  |  |  |  |  |  |  |  |  |
|---|---|---|---|---|---|---|---|---|
| B0 | 0 | 25 | 2 | 19 | 4 | 13 | 14 | 15 |
| B1 | 8 | 9 | 50 | 59 | 12 | 5 | 6 | 7 |
| B2 | 16 | 17 | 10 | 11 | 20 | 21 | 30 | 23 |
| B3 | 24 | 1 | 18 | 3 | 28 | 37 | 22 | 47 |
| B0 | 40 | 57 | 58 | 35 | 44 | 53 | 38 | 55 |
| B1 | 32 | 41 | 42 | 51 | 60 | 29 | 46 | 63 |
| B2 | 48 | 49 | 26 | 43 | 52 | 61 | 62 | 31 |
| B3 | 56 | 33 | 34 | 27 | 36 | 45 | 54 | 39 |

FIG. 12(b)

RASTER SCAN (DIRECTION OF ROWS)

RASTER SCAN (DIRECTION OF COLUMNS)

RASTER SCAN (DIRECTION OF ROWS)

FIG. 25(a) (PRIOR ART)

ZIGZAG SCAN (DIRECTION OF COLUMNS)

FIG. 25(b)
(PRIOR ART)

HUFFMAN ENCODER FOR ENCODING/DECODING DCT COEFFICIENTS

TECHNICAL FIELD

The present invention relates to a technique for processing image data and to a technique for performing an image compression process and a decompression process at a higher speed.

BACKGROUND OF THE INVENTION

Image data includes a huge amount of information. It is therefore impractical to process image data as it is from the viewpoint of the memory capacity and communication speed. Techniques for compressing image data are therefore important.

One of international standards for image data compression is the JPEG (Joint Photographic Expert Group). JPEG adopts the DCT (discrete cosine transformation) method which involves irreversible encoding and the reversible encoding method which involves DPCM (differential pulse code modulation) in a two-dimensional space. The compression of image data according to the DCT method will now be described.

FIG. 18 is a block diagram showing a basic configuration of a system for performing image data compression and image data decompression according to the DCT method.

At the encoding end, a DCT process portion 100 performs a discrete cosine transformation (hereinafter referred to as "DCT") process on original image data input thereto to output DCT coefficients. A quantizing portion 200 quantizes the DCT coefficients output by the DCT process portion 100 with reference to a quantization table 400 to output quantized DCT coefficients. Image quality and the amount of encoded information are controlled through such quantization. A Huffman encoding portion 206 performs a Huffman encoding process on the DCT coefficients output by the quantizing portion 200 to output compressed image data.

At the decoding end, a Huffman decoding portion 211 performs a Huffman decoding process on compressed image data with reference to an encoding table 500 to output quantized DCT coefficients. A dequantizing portion 700 performs dequantization on the quantized DCT coefficients with reference to the quantization table 400 to output DCT coefficients. A reverse DCT process portion 800 performs a reverse DCT process on the DCT coefficients to output reproduced image data.

Next, the DCT process performed by the DCT process portion 100 will be described. First, as shown in FIG. 19, image data is divided into a plurality of 8×8 pixel blocks. As shown in FIG. 20, one 8×8 pixel block includes 64 items of pixel data $P_{XY}$ (X, Y=0, ..., 7). Two-dimensional DCT expressed by Equation 1 is performed on each of 8×8 pixel blocks thus divided.

(Equation 1)

$$S_{UV} = \frac{1}{4} C_U C_V \sum_{X=0}^{7} \sum_{Y=0}^{7} (P_{XY} - L_S) \cos\frac{(2X+1)U\pi}{16} \cos\frac{(2Y+1)V\pi}{16}$$

where $S_{UV}$ (U, V=0, ..., 7) represents DCT coefficients. When the bit precision of pixel data $P_{XY}$ is 12 bits, $L_S$=128 and, when the bit precision of pixel data $P_{XY}$ is 12 bits, $L_S$=2048.

where $S_{UV}$ (U, V=0, ..., 7) represents DCT coefficients. When the bit precision of pixel data $P_{XY}$ is 8 bits, $L_S$=128 and, when the bit precision of pixel data $P_{XY}$ is 12 bits, $L_S$=2048.

As a result of the DCT process, 64 DCT coefficients $S_{UV}$ are obtained. The DCT coefficient $S_{00}$ is referred to as "DC coefficient", and the remaining 63 DCT coefficients are referred to as "AC coefficients". As shown in FIG. 20, the number of horizontal frequency components at high frequencies included in a block which has been subjected to the DCT process increases from left to right, and the number of vertical frequency components at high frequencies included increased from top to bottom.

At the reverse DCT process portion 800, 64 pixel data $P_{XY}$ (X, Y=0, ..., 7) are obtained from the DCT coefficients $S_{UV}$ through a reverse DCT process expressed by Equation 2.

(Equation 2)

$$P_{XY} = \frac{1}{4} \sum_{U=0}^{7} \sum_{V=0}^{7} C_U C_V S_{UV} \cos\frac{(2X+1)U\pi}{16} \cos\frac{(2Y+1)V\pi}{16} + L_S$$

As shown in FIG. 21, two-dimensional DCT is performed by two one-dimensional DCT circuits 110 and 130 and an inversion memory 120. The horizontal direction of an 8×8 pixel block is referred to "row direction", and the vertical direction is referred to as "column direction".

The one-dimensional DCT 110 performs one-dimensional DCT as expressed by Equation 3 on image data $f_x$, and writes one-dimensional DCT coefficients $F_U$ representing the results in each row of the inversion memory 120.

(Equation 3)

$$F_U = \frac{1}{4} C_U \sum_{X=0}^{7} fx \cos\frac{(2X+1)U\pi}{16}$$

The one-dimensional DCT circuit 130 performs one-dimensional DCT on the one-dimensional DCT coefficients $F_U$ stored in each row of the inversion memory 120 and outputs the results as DCT coefficients $S_{UV}$.

One-dimensional reverse DCT is expressed by Equation 4.

(Equation 4)

$$fx = \sum_{U=0}^{7} C_U F_U \cos\frac{(2X+1)U\pi}{16}$$

A description will now be made on the Huffman encoding process performed by the Huffman encoding portion 206. FIG. 22 shows examples of DCT coefficients output by the quantizing portion 200. In FIG. 22, "A", "B", "C", "D", "E" and "F" represent values other than "0".

The Huffman encoding portion 206 in FIG. 18 performs a Huffman encoding process on DCT coefficients output by the quantizing portion 200 to output compressed image data. Referring to encoding of a DC coefficient, the difference between the DC coefficient of the current block and the DC coefficient of the preceding block is obtained, and a Huffman code is assigned to the difference.

Referring to encoding of AC coefficients, as shown in FIG. 23, the AC coefficients are first arranged on a one-dimensional basis as a result of zigzag scan. The one-dimensionally arranged AC coefficients are encoded using run lengths representing the length of consecutive coefficients "0" (invalid coefficients) and the values of coefficients (valid coefficients) other than "0". The valid coefficients are divided into groups, and a group number is assigned to each valid coefficient. When AC coefficients are encoded, a Huffman code is assigned to a combination of a run length and a group number. Original image data are encoded into compressed image data as described above.

[First Object]

As described above, a block consisting of 8×8=64 data is treated as one unit to be processed according to the JPEG method. At the DCT process, two-dimensional DCT is performed by performing one-dimensional DCT in the column direction and one-dimensional DCT in the row direction on data in each block. Similarly, at the reverse DCT process, two-dimensional reverse DCT is performed by performing one-dimensional reverse DCT in the column direction and one-dimensional reverse DCT in the row direction on data in each block. An inversion memory for storing 64 items of data in one block is used in such a DCT process and reverse DCT process.

In this case, as shown in FIG. 24(a), data are written in an inversion memory TM in the order of raster scan in the row direction and, as shown in FIG. 24(b), the data stored in the inversion memory TM are read in the order of raster scan in the column direction. As a result, data in each block can be rearranged from the order of raster scan in the row direction to the order of raster scan in the column direction.

In the Huffman encoding process and Huffman decoding process, a bank memory for storing 64 items of data of one block is used. At the encoding end, as shown in FIG. 25(a), data are written in a bank memory BM in the order of raster scan and, as shown in FIG. 25(b), the data stored in the bank memory BM are read in the order of zigzag scan. As a result, data in each block can be rearranged from the order of raster scan to the order of zigzag scan. At the decoding end, as shown in FIG. 25(b), data are written in a bank memory BM in the order of zigzag scan and, as shown in FIG. 25(a), the data stored in the bank memory BM are read in the order of raster scan. As a result, data in each block can be rearranged from the order of zigzag scan to the order of raster scan.

In order to increase the speed of a process, a plurality of items of data must be processed simultaneously. For example, at the DCT process and reverse DCT process, two inversion memories each having a storage capacity of 64 are used; and the same 64 items of data are stored in each of the two inversion memories; and different data are read from the two inversion memories simultaneously. This makes it possible to increase the data processing speed. Similarly, at the Huffman encoding process and Huffman decoding process, two bank memories each having a storage capacity of 64 are used; and the same 64 items of data are stored in each of the two bank memories; and different data are read from the two bank memories simultaneously. This makes it possible to increase the data processing speed.

However, two inversion memories are required for each of the DCT process and reverse DCT process, and two bank memories are required for each of the Huffman encoding process and Huffman decoding process. This hinders efforts toward reductions of the size and cost of a system.

It is therefore a first object to provide a data processor which is capable of rearranging data at a first speed and whose size and cost can be reduced.

[Second Object]

A block consisting of 8×8=64 data is treated as one unit to be processed according to the JPEG method. For example, at the encoding end, as shown in FIG. 26, quantized DCT coefficients output by the quantizing portion 200 (see FIG. 18) are stored in a bank memory 221 as data. As shown in FIG. 27, the data stored in the bank memory 221 are read in the order of zigzag scan in synchronism with a clock signal CLK and are sequentially transferred to a Huffman encoding circuit 222 through 11-bit data bus DB0.

In the example in FIG. 27, eight items of data "D0", "D1", "0", "D2", "0", "0", "D3" and "D4" are sequentially transferred. Here, "0" represents an invalid coefficient, and "D0", "D1", "D2", "D3" and "D4" represent valid coefficients.

When AC coefficients are encoded, the Huffman encoding circuit 222 detects run lengths indicating the number of consecutive "0s" and valid coefficients based on the data sequentially transferred by the bank memory 221 and performs Huffman encoding based on combinations of a run length and a valid coefficient.

In the conventional Huffman encoding portion 206, items of data are transferred from the bank memory 221 to the Huffman encoding circuit 222 one by one as described above and, therefore, the number of cycles required for processing the data can not be reduced. In the above-described example, the time required for processing eight items of data corresponds to eight cycles of the clock signal CLK. Therefore, the speed of the process at the Huffman encoding portion 206 can not be increased. Similarly, the speed of the process at the Huffman decoding portion 211 can not be increased.

It is therefore a second object to provide a Huffman encoder with an improved processing speed. It is another object to provide a Huffman decoder with an improved processing speed.

[Third Object]

FIG. 28 is a block diagram showing an example of a conventional Huffman decoder. A head search process portion 311 detects the position of the head of a Huffman code from compressed image data and supplies compressed image data in a bit quantity corresponding to a maximum code length of Huffman codes counted from the detected head position to an address input terminal AD of a memory 312 as an address signal.

The memory 312 has a storage capacity of $2^k$ words. Here, k represents the maximum code length of Huffman codes. In each address in the memory 312, decoded data associated with a Huffman code represented by the address are stored. Each decoded data consists of a run length and a group number as described above.

For example, if it is assumed that the maximum length k of Huffman codes is 16, decoded data corresponding to a 16-bit long Huffman code "1111111111110101" are stored in an address "1111111111111010". Decoded data corresponding to a 15-bit long Huffman code "111111111000010" are stored in two addresses "11111111100000X". Here, X represents 0 and 1. Decoded data corresponding to a 2-bit long Huffman code "01" are stored in $2^{14}$ addresses "01xxxxxxxxxxxxxx".

Since 16-bit compressed image data corresponding to the maximum code length are thus supplied to the memory 312 as address signals, decoded data associated with a Huffman code shorter than the maximum code length must be stored in a plurality of addresses.

For example, when compressed image data include a 2-bit Huffman code "01", 16-bit compressed image data "01 . . . " are supplied to the memory 312 as an address signal. As a result, decoded data stored in an address "01 . . ." are read and output from a data output terminal D0. Thus, the Huffman code included in the compressed image data is decoded.

As described above, since compressed image data in a bit quantity corresponding to the maximum code length k of Huffman codes are supplied to the memory 312 as an address signal in the conventional Huffman decoder, the memory 312 must have a storage capacity of $2^k$ words.

In this case, decoded data associated with a Huffman code shorter than the maximum code length k are stored in a plurality of addresses. That is, extra decoded data must be stored in addresses in a quantity much greater than the number of Huffman codes. If it is assumed that the number of Huffman codes is represented by N, the utilization rate of the memory 312 is as very low as $N/2^k$.

As a result, the circuit of the Huffman decoder becomes large-scale, and it becomes difficult to increase the processing speed.

It is therefore a third object to provide a Huffman decoder with a reduced size and an increased speed.

DISCLOSURE OF THE INVENTION

[First Invention]

A first invention (1-1) of the present invention is a data processor for processing a block formed by two-dimensional data in a plurality of rows and a plurality of columns, characterized in that it comprises:

storage means for storing the data of the block;

write means for writing the data of the block in said storage means in a first order of scan; and read means for reading the data of the block stored in said storage means in a second order of scan and in that:

said storage means includes n memories where n is an integer equal to or greater than 2, and the data of the block are distributed to said n memories such that n items of data consecutive in the first order of scan are stored in n different memories and n items of data consecutive in the second order of scan are stored in the different n memories;

said write means simultaneously writes data in different memories in the first order of scan; and said read means simultaneously reads the data from the different memories in the second order of scan.

A first invention (1-2) of the present invention is a method for processing data for processing a block formed by two-dimensional data in a plurality of rows and a plurality of columns, characterized in that it comprises the steps of:

distributing the data of the block to n memories and storing them in the different memories by simultaneously writing the same in a first order of scan such that n items of data (n is an integer equal to or greater than 2) consecutive in the first order of scan are stored in the different n memories and such that n items of data consecutive in a second order of scan are stored in the n different memories; and reading the stored data of the block from the different memories in the second order of scan simultaneously.

In this case, data in the plurality of rows and the plurality of columns of the block are distributed to and stored in the n memories. The data of the block are distributed to the n memories such that n items of data consecutive in the first order of scan are stored in the different n memories and such that n items of data consecutive in the second order of scan are stored in the n different memories. It is therefore possible to simultaneously write data in the different memories in the first order of scan with write means and to read the data simultaneously from the different memories in the second order of scan with read means. As a result, the data of the block can be rearranged from the first order of scan to the second order of scan at a high speed. In this case, the storage capacity required for each of the memories is 1/n of the number of items of data in one block. Therefore, there is provided a data processor and a method for processing data in which data can be processed at a high speed and which allows a smaller size and a low cost.

A first invention (2-1) of the present invention is a data processor for processing a block formed by two-dimensional data in m rows and n columns, characterized in that it comprises:

storage means for storing the data of the block;

write means for writing the data of the block in said storage means in a first order of scan; and read means for reading the data of the block stored in said storage means in a second order of scan and in that:

said storage means includes n memories where said n is a divisor of m, which is equal to or greater than 2, and the data of the block are distributed to said n memories such that n items of data consecutive in the first order of scan are stored in the n different memories and n items of data consecutive in the second order of scan are stored in the n different memories;

said write means simultaneously writes data in the n different memories in the first order of scan; and said read means simultaneously reads the data from the n different memories in the second order of scan.

A first invention (2-2) of the present invention is a method for processing data for processing a block formed by two-dimensional data in m rows and m columns, characterized in that it comprises the steps of:

distributing the data of the block to n memories and storing them in the different memories by simultaneously writing the same in a first order of scan such that n items of data (n is an integer equal to or greater than 2, and n is a divisor of m, which is equal to or greater than 2) consecutive in the first order of scan are stored in the n different memories and such that n items of data consecutive in a second order of scan are stored in the n different memories; and reading the stored data of the block from the different memories in the second order of scan simultaneously.

In this case, data in the m rows and m columns in the block are distributed to and stored in the n memories. The data of the block are distributed to the n memories such that n items of data consecutive in the first order of scan are stored in the n different memories and such that n items of data consecutive in the second order of scan are stored in the n different memories. It is therefore possible to simultaneously write data in the different memories in the first order of scan with write means and to read the data simultaneously from the different memories in the second order of scan with read means. As a result, the data of the block can be rearranged from the first order of scan to the second order of scan at a high speed. In this case, the storage capacity required for each of the memories is 1/n of the number of items of data in one block. Therefore, there is provided a data processor and a method for processing data in which data can be processed at a high speed and which allow a small size and a low cost.

A first invention (3-1) of the present invention is a data processor according to the first (1-1) of the present invention or the first (2-1) of the present invention, characterized in that said first order of scan is the order of raster scan in either of the column direction and the row direction and in that said second order of scan is the order of raster scan in the other of the column direction and the row direction.

A first invention (3-2) of the present invention is a method for processing data according to the first (1-2) of the present invention or the first (2-2) of the present invention, characterized in that said first order of scan is the order of raster scan in either of the column direction and the row direction and in that said second order of scan is the order of raster scan in the other of the column direction and the row direction.

In this case, the data of a block can be rearranged from the order of raster scan in the row direction or in the column direction to the order of raster scan in the column direction or in the row direction at a high speed.

A first invention (4-1) of the present invention is a data processor according to the first (1-1) of the present invention or the first (2-1) of the present invention, characterized in that said first order of scan is either of the order of raster scan and the order of zigzag scan and in that said second order of scan is the other of the order of raster scan and the order of zigzag scan.

A first invention (4-2) of the present invention is a method for processing data according to the first (1-2) of the present invention or the first (2-2) of the present invention, characterized in that said first order of scan is either of the order of raster scan and the order of zigzag scan and in that said second order of scan is the other of the order of raster scan and the order of zigzag scan.

In this case, the data of a block can be rearranged from the order of raster scan to the order of zigzag scan at a high speed.

[Second Invention]

A second invention (1-1) of the present invention is a Huffman encoder for encoding DCT coefficients into Huffman codes, characterized in that it comprises:

storage means for storing a plurality of DCT coefficients;
read means for reading a plurality of the DCT coefficients stored in said storage means at a time;
counting means for counting the number of consecutive invalid coefficients until a valid coefficient is encountered in the DCT coefficients read by said read means from said storage means and for sequentially outputting data constituted by combinations of the number of consecutive invalid coefficients and a valid coefficient; and
encoding means for performing a Huffman encoding process based on the data sequentially output by said counting means to generate Huffman codes.

A second invention (1-2) of the present invention is a method for Huffman encoding for encoding DCT coefficients into Huffman codes, characterized in that it comprises the steps of:

reading a plurality of DCT coefficients at a time;
counting the number of consecutive invalid coefficients until a valid coefficient is encountered among the read DCT coefficients and sequentially calculating data constituted by combinations of the number of consecutive invalid coefficients and a valid coefficient; and
performing a Huffman encoding process based on the sequentially calculated data to generate Huffman codes.

In this case, a plurality of the DCT coefficients stored in the storage means are read by the read means at a time. The number of consecutive invalid coefficients is counted by the counting means until a valid coefficient is encountered among the DCT coefficients read from the storage means to sequentially output data constituted by combinations of the number of consecutive invalid coefficients and a valid coefficient. The encoding means performs a Huffman encoding process based on the data sequentially output by the counting means to generate Huffman codes. Thus, since a plurality of DCT coefficients are read from the storage means at a time, the number of cycles required for the transfer of the DCT coefficients from the storage means to the counting means is reduced. Further, the number of items of data output by the counting means is reduced when invalid coefficients consecutively exist in the DCT coefficients read from the storage means, which reduces the number of cycles required for the transfer of data from the counting means to the encoding means and reduces the processing load of the encoding means. This increases the processing speed of a Huffman encoder and a method for Huffman encoding, thereby providing improved performance.

A second invention (2-1) of the present invention is a Huffman encoder for encoding DCT coefficients into Huffman codes, characterized in that it comprises:

storage means for storing a plurality of DCT coefficients;
read means for reading a plurality of the DCT coefficients stored in said storage means at a time;
a plurality of data buses for respectively transferring a plurality of the DCT coefficients read by said read means from said storage means at a time;
a plurality of data storage means for storing input data and outputting the same in the order of input;
counting means for counting the number of consecutive invalid coefficients until a valid coefficient is encountered in the DCT coefficients transferred by said plurality of data buses and for sequentially inputting data constituted by combinations of the number of consecutive invalid coefficients and a valid coefficient to said plurality of data storage means;
selection means for sequentially selecting and outputting data respectively output by said plurality of data storage means; and
encoding means for performing a Huffman encoding process based on the data output by said selection means to generate Huffman codes.

A second invention (2-2) is a method for Huffman encoding for encoding DCT coefficients into Huffman codes, characterized in that it comprises the steps of:

reading a plurality of DCT coefficients at a time;
transferring the plurality of read DCT coefficients using a plurality of data buses respectively;
storing the transferred data respectively;
counting the number of consecutive invalid coefficients until a valid coefficient is encountered among the transferred DCT coefficients and sequentially calculating data constituted by combinations of the number of consecutive invalid coefficients and a valid coefficient; and
performing a Huffman encoding process based on the calculated data to generate Huffman codes.

In this case, a plurality of the DCT coefficients stored in the storage means are read by the read means at a time and are transferred by the plurality of data buses. The number of consecutive invalid coefficients is counted by the counting means until a valid coefficient is encountered among the DCT coefficients transferred by the plurality of data buses, and data constituted by combinations of the number of consecutive invalid coefficients and a valid coefficient are sequentially input to the plurality of data storage means.

Data respectively output by the plurality of data storage means are sequentially selected and output by the selection means, and a Huffman encoding process is performed by the encoding means based on the data output by the selection means to generate Huffman codes. Thus, since a plurality of the DCT coefficients read from the storage means in pluralities are transferred to the counting means at a time, the number of cycles required for the transfer of the DCT coefficients from the storage means to the counting means is reduced. Further, the number of items of data output by the selection means is reduced when invalid coefficients consecutively exist in the DCT coefficients read from the storage means, which reduces the number of cycles required for the transfer of data from the selection means to the encoding means and reduces the processing load of the encoding means. This increases the processing speed of a Huffman encoder and a method for Huffman encoding, thereby providing improved performance.

A second invention (3-1) of the present invention is a Huffman decoder for decoding Huffman codes into DCT coefficients, characterized in that it comprises:
  decoding means for performing a Huffman decoding process on Huffman codes input thereto to sequentially output data constituted by combinations of the number of consecutive invalid coefficients and a valid coefficient;
  generation means for generating DCT coefficients based on the data output by said decoding means and for outputting a plurality of the generated DCT coefficients at a time;
  storage means for storing a plurality of DCT coefficients; and
  write means for writing a plurality of the DCT coefficients output by said generation means in said storage means at a time.

A second invention (3-2) of the present invention is a method for Huffman decoding for decoding Huffman codes into DCT coefficients, characterized in that it comprises the steps of:
  performing a Huffman decoding process on Huffman codes input thereto;
  sequentially outputting data constituted by combinations of the number of consecutive invalid coefficients and a valid coefficient;
  generating DCT coefficients based on the output data;
  outputting a plurality of the generated DCT coefficients at a time; and
  writing a plurality of the output DCT coefficients at a time.

In this case, a Huffman decoding process is performed by the decoding means on input Huffman codes; data constituted by combinations of the number of consecutive invalid coefficients and a valid coefficient are sequentially output; DCT coefficients are generated by the generation means based on the output data; and a plurality of the generated DCT coefficients are output at a time. A plurality of the DCT coefficients output by the generation means are written in the storage means by the write means at a time. Thus, the number of data output by the decoding means is reduced when a great number of consecutive invalid coefficients exist, which reduces the number of cycles required for the transfer of data from the decoding means to the generation means and reduces the processing load of the decoding means. Further, since a plurality of DCT coefficients are output by the generation means at a time and a plurality of the output DCT coefficients are written in the storage means at a time, the number of cycles required for the transfer of the DCT coefficients from the generation means to the storage means is reduced. This increases the processing speed of a Huffman decoder and a method for Huffman decoding, thereby providing improved performance.

A second invention (4-1) of the present invention is a Huffman decoder for decoding Huffman codes into DCT coefficients, characterized in that it comprises:
  decoding means for performing a Huffman decoding process on Huffman codes input thereto to sequentially output data constituted by combinations of the number of consecutive invalid coefficients and a valid coefficient;
  a plurality of data storage means for storing data input thereto and for outputting the same in the order of input;
  selection means for selecting the data output by said decoding means and sequentially inputting the same to said plurality of data storage means;
  generation means for generating DCT coefficients based on the data output by said plurality of data storage means and for outputting a plurality of the generated DCT coefficients at a time;
  a plurality of data buses for respectively transferring a plurality of the DCT coefficients output by said generation means at a time;
  storage means for storing a plurality of DCT coefficients; and
  write means for writing a plurality of the DCT coefficients transferred by said plurality of data buses in said storage means at a time.

A second invention (4-2) of the present invention is a method for Huffman decoding for decoding Huffman codes into DCT coefficients, characterized in that it comprises the steps of:
  performing a Huffman decoding process on Huffman codes input thereto;
  sequentially calculating data constituted by combinations of the number of consecutive invalid coefficients and a valid coefficient;
  selectively storing the calculated data;
  generating DCT coefficients based on the stored data;
  outputting a plurality of the generated DCT coefficients at a time;
  transferring the plurality of output DCT coefficients using a plurality of data buses respectively; and
  writing a plurality of the transferred DCT coefficients at a time.

In this case, a Huffman decoding process is performed by the decoding means on input Huffman codes, and data constituted by combinations of the number of consecutive invalid coefficients and a valid coefficient are sequentially output. The data output by the decoding means are selected by the selection means and are sequentially input to the plurality of storage means. DCT coefficients are generated by the generation means based on the data output by the plurality of data storage means, and a plurality of the generated DCT coefficients are output at a time and are respectively transferred by the plurality of data buses. A plurality of the DCT coefficients transferred by the plurality of data buses are written in the storage means by the write means at a time. Thus, the number of items of data output by the decoding means is reduced when a great number of consecutive invalid coefficients exist, which reduces the number of cycles required for the transfer of data from the decoding means to the selection means and reduces the processing load of the decoding means. Further, since a plurality of the DCT coefficients are output by the generation means at a time and a plurality of the output DCT coefficients are transferred to the storage means at a time, the number of cycles required for the transfer of the DCT coefficients from the generation means to the storage means is reduced. This increases the processing speed of a Huffman decoder and a method for Huffman decoding, thereby providing improved performance.

[Third Invention]

A third invention (1-1) of the present invention is a Huffman decoder for decoding Huffman codes input thereto to output decoded data, characterized in that it comprises:

a plurality of first storage means for respectively storing a predetermined number of Huffman codes among a plurality of Huffman codes;

a plurality of match detection means provided in association with said plurality of first storage means, each of which detects match between an input Huffman code and the Huffman codes stored in the first storage means associated therewith;

second storage means for storing a predetermined number of decoded data associated with said predetermined number of Huffman codes respectively and for outputting any of said predetermined number of decoded data in response to a signal output by said plurality of match detection means;

frequency-of-occurrence generating means for generating a frequency of occurrence based on a Huffman code input thereto; and third storage means for storing decoded data in an address indicated by the frequency of occurrence of at least the plurality of remaining Huffman codes among said plurality of Huffman codes, for receiving the frequency of occurrence generated by said frequency-of-occurrence generating means as an address signal and for outputting decoded data from an address specified by the address signal.

A third invention (1-2) of the present invention is a method for Huffman decoding for decoding Huffman codes to output decoded data, characterized in that it comprises the steps of:

storing a predetermined number of Huffman codes among a plurality of Huffman codes respectively;

storing a predetermined number of decoded data associated with said predetermined number of Huffman codes respectively;

detecting match between an input Huffman code and said stored Huffman codes associated therewith;

outputting any of said predetermined number of decoded data in response to said match detection signal and storing decoded data in an address indicated by the frequency of occurrence of at least the plurality of remaining Huffman codes among said plurality of Huffman codes;

generating a frequency of occurrence based on the input Huffman code;

receiving said frequency of occurrence as an address signal; and outputting decoded data from an address specified by said address signal.

In this case, a predetermined number of Huffman codes among a plurality of Huffman codes are stored in the plurality of first storage means respectively. A predetermined number of decoded data associated with said predetermined number of Huffman codes are stored in the second storage means. Further, decoded data associated with at least the plurality remaining Huffman codes among the plurality of Huffman codes are stored in the third storage means. Each item of the decoded data is stored in an address indicated by the frequency of occurrence of a Huffman code associated therewith.

The plurality of match detection means detect match between an input Huffman code and Huffman codes stored in the plurality of first storage means respectively. If the match detection means detect match between the input Huffman code and any of the Huffman codes stored in the plurality of storage means, any of the predetermined number of decoded data stored in the second storage means is output in response to a signal output by the plurality of match detection means. In this case, the input Huffman code is decoded at a high speed as a result of the match detection by the match detection means and the output of the decoded data from the second storage means.

The frequency-of-occurrence generating means generates a frequency of occurrence based on a Huffman code input thereto. The frequency of occurrence generated by the frequency-of-occurrence generating means is supplied to the third storage means as an address signal. When no match occurs between the input Huffman code and the Huffman codes stored in the plurality of first storage means, decoded data is output by the third storage means based on the frequency of occurrence supplied by the frequency-of-occurrence generating means as an address signal.

Thus, since a predetermined number of decoded data associated with a predetermined number of Huffman codes respectively are stored in the second storage means, when an input Huffman codes matches any of the predetermined number of Huffman codes, the decoded data associated therewith is read at a high speed from the second storage means. When the input Huffman code matches none of the predetermined number of Huffman codes, the frequency of occurrence of the input Huffman code is generated, and decoded data associated therewith is read from the third storage means based on the frequency of occurrence.

Huffman codes and frequencies of occurrence are in one-to-one correspondence, and frequencies of occurrence and decoded data are also in one-to-one correspondence. Therefore, the number of the decoded data stored in the third storage means is equal to the number of the plurality of Huffman codes at the maximum.

Therefore, the third storage means is required to have only a small storage capacity.

It is therefore possible to provide a Huffman decoder and a method for Huffman decoding which allow a small size and a higher processing speed.

A third invention (2-1) of the present invention is a data processor according to the third (1-1) of the present invention, characterized in that said predetermined number of Huffman codes have frequencies of occurrence higher than those of the remaining Huffman codes.

A third invention (2-2) of the present invention is a method for processing data according to the third (1-2) of the present invention, characterized in that said predetermined number of Huffman codes have frequencies of occurrence higher than those of the remaining Huffman codes.

A third invention (3-1) of the present invention is a data processor according to the third (1-1) of the present invention, characterized in that said frequency-of-occurrence generating means includes:

constant storing means for storing a constant set for each code length of Huffman codes;

minimum code storing means for storing a minimum code for each code length of the Huffman codes;

code length detection means for detecting the code length of a Huffman code input thereto based on the minimum code for each code length stored in said minimum code storing means;

constant selection means for selecting any of the constants stored in said constant storing means based on the code length detected by said code length detection means; and calculation means for calculating a frequency of occurrence based on the constant selected by said constant selection means and the input Huffman code.

A third invention (3-2) of the present invention is a method for processing data according to the third (1-2) of the present invention, characterized in that said step of generating a frequency of occurrence includes the steps of:

storing a constant set for each code length of Huffman codes;

storing a minimum code for each code length of the Huffman codes;

detecting the code length of an input Huffman code based on said stored minimum code for each code length;

selecting any of the stored constants based on said detected code length; and generating a frequency of occurrence based on the selected constant and the input Huffman code.

In this case, the frequency of occurrence of a Huffman code is obtained by subtracting a constant set for each code length from the Huffman code. The constant storage means stores the constant set for each code length of Huffman codes. The minimum code storage means stores a minimum code for each code length of Huffman codes. The code length of an input Huffman code is detected based on the minimum code for each code length stored in the minimum code storage means, and any of the constants stored in the constant storage means is selected based on the detected code length. A frequency of occurrence is calculated based on the selected constant and the input Huffman code.

A third invention (4-1) of the present invention is a data processor according to the third (1-1) of the present invention, characterized in that it further comprises decoded data selecting means for selectively outputting decoded data output by said second and third storage means.

A third invention (4-2) of the present invention is a method for processing data according to the third (1-2) of the present invention, characterized in that the output decoded data are selectively output.

When an input Huffman code matches the predetermined number of Huffman codes, the decoded data output by the second storage means is selectively output and, when the input Huffman code does not match the predetermined number of Huffman codes, the decoded data output by the third storage means is selectively output.

BRIEF DESCRIPTION OF THE DRAWINGS

FIGS. 2(a), 2(b), 2(c), and 2(d) illustrate a method for distributing data in odd-numbered blocks to memories according to said first embodiment.

FIGS. 3(a), 3(b), 3(c), and 3(d) illustrate a method for distributing data in even-numbered blocks to memories according to said first embodiment.

FIG. 4 illustrates changes in the address and write data for the odd-numbered blocks in said first embodiment during a write.

FIG. 5 illustrates changes in the address and read data for odd-numbered blocks in said first embodiment during a read.

FIGS. 6(a), 6(b), and 6(c) illustrate a method for distributing data of a block among two inversion memories.

FIGS. 7(a), 7(b), and 7(c) illustrate a method for distributing data of a block among four inversion memories.

FIGS. 8(a), 8(b), and 8(c) illustrate a method for distributing data of a block among eight inversion memories.

FIGS. 9(a), 9(b), 9(c), and 9(d) illustrate a method for distributing data of a block to memories according to a second embodiment of the first invention.

FIG. 10 illustrates changes in the address and data during a write and read in said second embodiment.

FIG. 11 illustrates changes in the address and data during a write and read in said second embodiment.

FIGS. 12(a) and 12(b) illustrate a method for distributing data of a block among four bank memories.

FIGS. 14(a), 14(b), and 14(c) illustrate an example of an operation of the Huffman encoder in FIG. 13.

FIGS. 18 through 23, 24(a), 24(b), 25(a), 25(b), and 26 through 28 are illustrations of the prior art. In FIGS. 1 though 12, 1 and 2 represent memories; 3 represents a control portion; 4 and 5 represent bit switching portions; 6 represents a write address counter; 7 represents a read address counter; 8, 10 and 11 represent address conversion portions; 12, 13, 14 and 15 represent address switching portions; and 16 represents a read data switching portion.

In FIGS. 13 through 15, 201 and 215 represent bank memories; 202 and 216 represent address generating portions; 203 and 214 represent data counter portions; 204a, 204b, 213a and 213b represent FIFOs; 205 and 212 represent selectors; 206 represents a Huffman encoding portion; and 211 represents a Huffman decoding portion.

In FIGS. 16 and 17, 301 represents a head search process portion; 302 represents a frequency-of-occurrence generating portion: 303 represents a memory: 304 represents a register; 305 represents a selector; R1 and R1 represent registers; C1 and Ci represent comparators; 321 represents a constant storing portion; 322 represents a minimum code storing portion; 323 represents a code length detecting portion; 324 represents a selector; and 325 represents an adder.

BEST MODES FOR CARRYING OUT THE INVENTION

Modes for carrying out the invention will now be described in detail with reference to the drawings. Throughout the drawings, like reference numbers indicate like or corresponding parts.

[First Invention]

Figure 1:
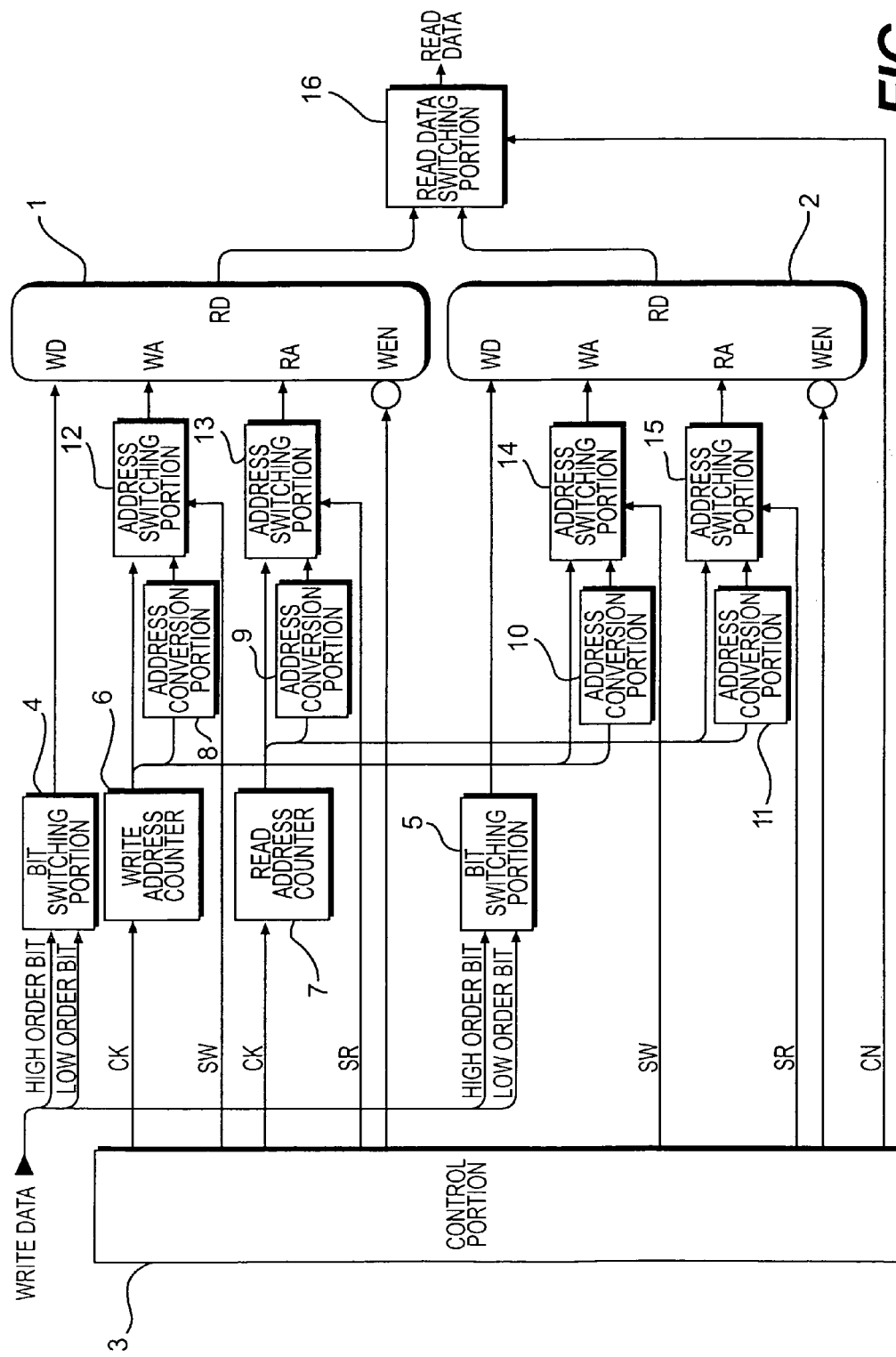
FIG. 1 is a block diagram showing a configuration of a data processor in a first embodiment of the first invention.

FIG. 1 is a block diagram showing a configuration of a data processor in a first embodiment of the first invention (hereinafter referred to as "first embodiment").

The data processor of the first embodiment is used for rearranging 8×8 blocks of data from the order of raster scan in a row direction to the order of raster scan in a column direction or from the order of raster scan in the column direction to the order of raster scan in the row direction during a DCT process or reverse DCT process.

The data processor in FIG. 1 includes two memories 1 and 2, a control portion 3, bit switching portions 4 and 5, a write address counter 6, a read address counter 7, address conversion portions 8, 9, 10 and 11, address switching portions 12, 13, 14 and 15 and a read data switching portion 16. Each of the memories 1 and 2 has 32 addresses (a storage capacity of 32 words) and is used as an inversion memory.

Write data including two items of data are supplied to the bit switching portions 4 and 5 in the order of raster scan in the row direction or in the column direction. In this case, each item of written data includes the preceding item of data as a high order bit and the succeeding item of data as a low order bit.

The bit switching portion 4 supplies the data of either the high order bit or low order bit of written data to a write data terminal WD of the memory 1, and the bit switching portion 5 supplies the data of the other of the high order bit and low order bit of the written data to a write data terminal WD of the memory 2.

The write address counter 6 counts clock signals CK supplied by the control portion 3 and generates write addresses for odd-numbered blocks. The address conversion portion 8 converts the write addresses for odd-numbered blocks output by the write address counter 6 into write addresses for even-numbered blocks. In response to switching signals SW from the control portion 3, the address switching portion 12 selectively supplies the write addresses output by write address counter 6 or the write addresses output by the address conversion portion 8 to a write address terminal WA of the memory 1.

Similarly, the address conversion portion 10 converts write addresses for odd-numbered blocks output by the write address counter 6 into write addresses for even-numbered blocks. In response to switching signals SW from the control portion 3, the address switching portion 14 selectively supplies the write addresses output by write address counter 6 or the write addresses output by the address conversion portion 10 to a write address terminal WA of the memory 2.

The read address counter 7 counts clock signals CK supplied by the control portion 3 and generates read addresses for odd-numbered blocks. The address conversion portion 9 converts the read addresses for odd-numbered blocks output by the read address counter 7 into read addresses for even-numbered blocks. In response to switching signals SR from the control portion 3, the address switching portion 13 selectively supplies the read addresses output by read address counter 7 or the read addresses output by the address conversion portion 9 to a read address terminal RA of the memory 1.

Similarly, the address conversion portion 11 converts read addresses for odd-numbered blocks output by the read address counter 7 into read addresses for even-numbered blocks. In response to switching signals SR from the control portion 3, the address switching portion 15 selectively supplies the read addresses output by read address counter 7 or the read addresses output by the address conversion portion 11 to a read address terminal RA of the memory 2.

Write enable signals for permitting data writing are supplied by the control portion 3 to write enable terminals WEN of the memories 1 and 2. As a result, data supplied to the write data terminal WD are written in storage locations specified by write addresses supplied to the write address terminal WA.

Data are read from storage locations specified by read addresses supplied to the address terminals RA of the memories 1 and 2 and are output from the read data terminals RD. In response to a control signal CN from the control portion 3, the read data switching portion 16 outputs read data which includes either of the two items of data output from the memories 1 and 2 preceding in the order of raster scan in the column direction or in the row direction as a high order bit and which includes the succeeding data as a low order bit.

A method for processing data according to the first embodiment will now be described. The method for processing data of the first embodiment is used for rearranging 8×8 blocks of data from the order of raster scan in the row direction to the order of raster scan in the column direction or from the order of raster scan in the column direction to the order of raster scan in the row direction during a DCT process or reverse DCT process.

The method for processing data includes the step of distributing data of the blocks to two memories such that two items of data consecutive in the order of raster scan in the row direction are stored in the two different memories and such that two items of data consecutive in the order of raster scan in the column direction are stored in the two different memories, the step of writing the data in the two different memories in the order of raster scan in the row direction simultaneously, and the step of reading the stored data of the blocks from the different memories in the order of raster scan in the column direction simultaneously.

The method for processing data will now be described in detail.

First, a description will now be made with reference to FIGS. 2 and 3 on a method for distribution at the step of distributing data of the block to the memories 1 and 2 in the method for processing data. In FIGS. 2 and 3, the numerals "0" through "63" in the blocks are given to specify respective items of data. The horizontal direction of the blocks is the row direction, and the vertical direction thereof is the column direction.

Data of odd-numbered blocks are written in the memories 1 and 2 in the order of raster scan in the row direction, and the data are read from the memories 1 and 2 in the order of raster scan in the column direction. Data of even-numbered blocks are written in the memories 1 and 2 in the order of raster scan in the column direction, and the data are read from the memories 1 and 2 in the order of raster scan in the row direction. As a result, the next block can be written concurrently with the read of the current block.

Referring to the odd-numbered blocks, as shown in FIG. 2(*a*), 64 items of data are arranged in a 8×8 block in the row direction, and items of data in each row of the block are divided by twos in the row direction to generate sets of data each consisting of two items of data. Then, as shown in FIG. 2(*b*), the two items of data of each set are distributed among different first and second groups. In FIG. 2, data belonging to the first group are hatched, and data belonging to the second group are not hatched. In this case, the two items of data of each set are distributed among the first and second groups such that two consecutive items of data belong to different groups when the data of the block are scanned in the column direction.

Figures 2C, 2D:
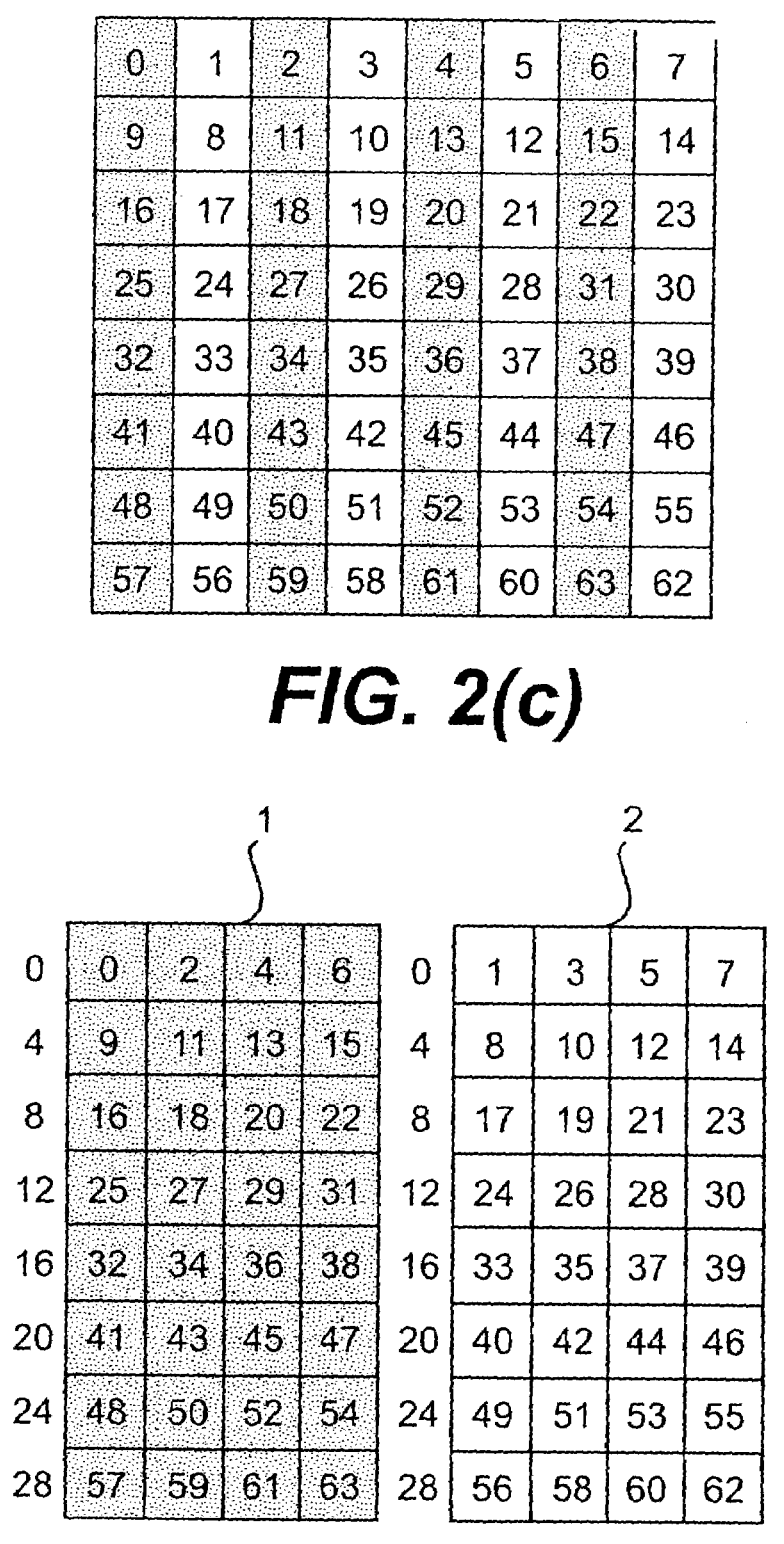

Next, as shown in FIG. 2(*c*), the positions of the two items of data in each set in the odd-numbered rows are switched each other. As a result, data of the first group are located in the odd-numbered columns, and data of the second group are located in the even-numbered columns. As shown in FIG. 2(d), the data of the first group in the odd-numbered columns are distributed to the memory 1, and the data of the second group in the even-numbered columns are distributed to the memory 2. In the figure, the addresses of the storage locations at the left ends of the memories 1 and 2 are "0", "4", "8", "12", "6", "20", "24" and "28" in the descending order.

By distributing data to the memories 1 and 2 in such a manner, two items of data consecutive in the order of raster scan in the row direction can be simultaneously written in the memories 1 and 2 respectively during a write, and two items of data consecutive in the order of raster scan in the column direction can be simultaneously read from the memories 1 and 2 during a read.

Referring to the even-numbered blocks, as shown in FIG. 3(a), 64 items of data are arranged in a 8×8 block in the column direction, and items of data in each row of the block are divided by twos in the row direction to generate sets of data each consisting of two items of arrayed data. Then, as shown in FIG. 3(b), the two items of data in each set are distributed among different first and second groups. In FIG. 3, data belonging to the first group are hatched, and data belonging to the second group are not hatched. In this case, the two items of data in each set are distributed among the first and second groups such that two consecutive items of data belong to different groups when the data of the block are scanned in the column direction.

Next, as shown in FIG. 3(c), the positions of the two items of data in each set in the odd-numbered rows are switched each other. As a result, data of the first group are located in the odd-numbered columns, and data of the second group are located in the even-numbered columns. As shown in FIG. 3(d), the data of the first group in the odd-numbered columns are distributed to the memory 1, and the data of the second group in the even-numbered columns are distributed to the memory 2. In the figure, the addresses of the storage locations at the left ends of the memories 1 and 2 are "0", "4", "8", "12", "16", "20", "24" and "28" in the descending order.

By distributing data to the memories 1 and 2 in such a manner, two items of data consecutive in the order of raster scan in the column direction can be simultaneously written in the memories 1 and 2 respectively during a write, and two items of data consecutive in the order of raster scan in the row direction can be simultaneously read from the memories 1 and 2 during a read.

FIG. 4 illustrates changes in the writing address and write data in the first embodiment. FIG. 4 shows a write of data in the odd-numbered blocks.

As shown in FIG. 4, when the writing address supplied to the memories 1 and 2 changes, two consecutive items of data are simultaneously written in the memories 1 and 2 in the order of raster scan in the row direction.

Figure 5:
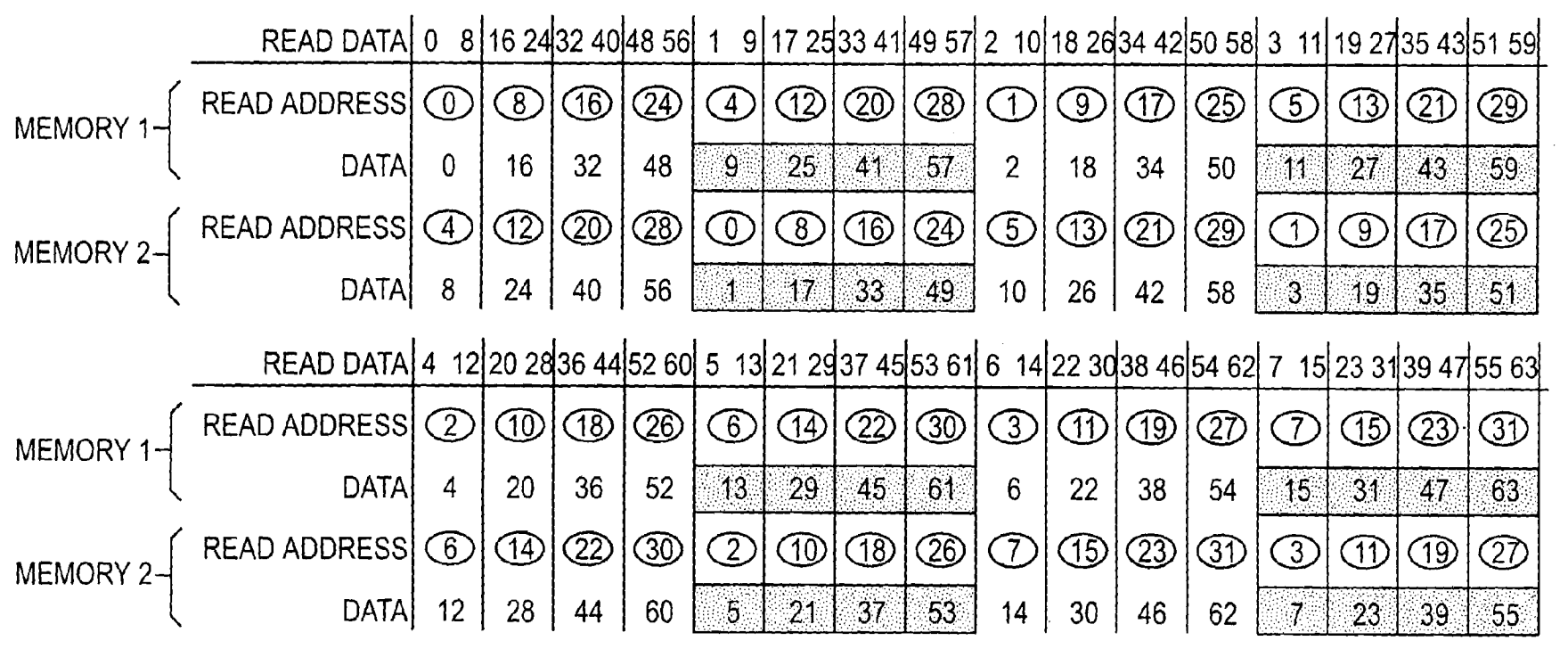

FIG. 5 illustrates changes in the reading address and read data in the first embodiment. FIG. 5 shows a read of data from the odd-numbered blocks.

As shown in FIG. 5, when the reading address supplied to the memories 1 and 2 changes, two consecutive items of data are simultaneously read from the memories 1 and 2 in the order of raster scan in the column direction.

Thus, in the data processor and the method for processing data of the first embodiment, two items of data consecutive in the order of raster scan in the row direction or in the column direction are simultaneously written in the memories 1 and 2 during a write, and two items of data consecutive in the order of raster scan in the column direction or in the row direction are simultaneously read from the memories 1 and 2 during a read, which makes it possible to increase the speed of data processing. Further, since 64 items of data can be simultaneously written and read in twos to and from the two memories 1 and 2 having 32 addresses, the size and cost of a system can be reduced.

While an example of distribution of data of a block among two inversion memories has been described in the first embodiment, the data of a block may be distributed among four or eight inversion memories.

FIG. 6 illustrates a method for distributing data of blocks among two inversion memories; FIG. 7 illustrates a method for distributing data of a block among four inversion memories; and FIG. 8 illustrates a method for distributing data of a block among eight inversion memories. In FIGS. 6, 7 and 8, data of a block are shown at (a); distribution of data in odd-numbered blocks is shown at (b); and distribution of data in even-numbered blocks are shown at (c).

In odd-numbered blocks, data are arranged in the order of raster scan in the row direction and, in even-numbered blocks, data are arranged in the order of raster scan in the column direction.

In the example in FIG. 6, data in each row are divided into four sets each including two items of data, and the two items of data in each set in the even-numbered rows are shifted one place in the set with the data in the odd-numbered rows unchanged. Then, data in the odd-numbered columns are distributed to an inversion memory B0, and data in the even-numbered columns are distributed to an inversion memory B1.

In the example in FIG. 7, data in each row are divided into two sets each including four items of data. The data in the first and fifth rows are kept unchanged; the four items of data in each set in the second and sixth rows are shifted one place in the set; the four items of data in each set in the third and seventh rows are shifted two places in the set; and the four items of data in each set in the fourth and eighth rows are shifted three places in the set. Then, data in the first and fifth columns are distributed to an inversion memory B0; data in the second and sixth columns are distributed to an inversion memory B1; data in the third and seventh columns are distributed to an inversion memory B2; and data in the fourth and eighth columns are distributed to an inversion memory B3.

In the example in FIG. 8, data in each row are divided into one set each including eight items of data. The eight items of data in each set in the second through eighth rows are sequentially shifted by respective amounts, i.e., one place—seven places in the respective sets, with the data in the first row kept unchanged. Then, data in first through eighth columns are respectively distributed to inversion memories B0 through B7.

A description will now be made on a data processor and a method for processing data in a second embodiment of the first invention (hereinafter referred to as "second embodiment"). The data processor and the method for processing data of the second embodiment are used to rearrange an 8×8 block of data from the order of raster scan to the order of zigzag scan or from the order of zigzag scan to the order of raster scan during a Huffman encoding process or Huffman decoding process.

The data processor of the second embodiment has a configuration similar to the configuration of the data processor shown in FIG. 1. The data processor of the second embodiment is different from the data processor of the first embodiment in the method for distributing data of a block to memories 1 and 2 and the method for specifying write addresses and read addresses. The memories 1 and 2 are used as bank memories.

Next, a description will now be made with reference to FIG. 9 on a method for distributing data to the memories 1 and 2 in the second embodiment. In FIG. 9, the numerals "0" through "63" in the block are given to specify respective items of data.

The description refers to a case in which data are written in the memories 1 and 2 in the order of raster scan in the column direction and in which data are read from the memories 1 and 2 in the order of zigzag scan.

Figures 9A, 9B:
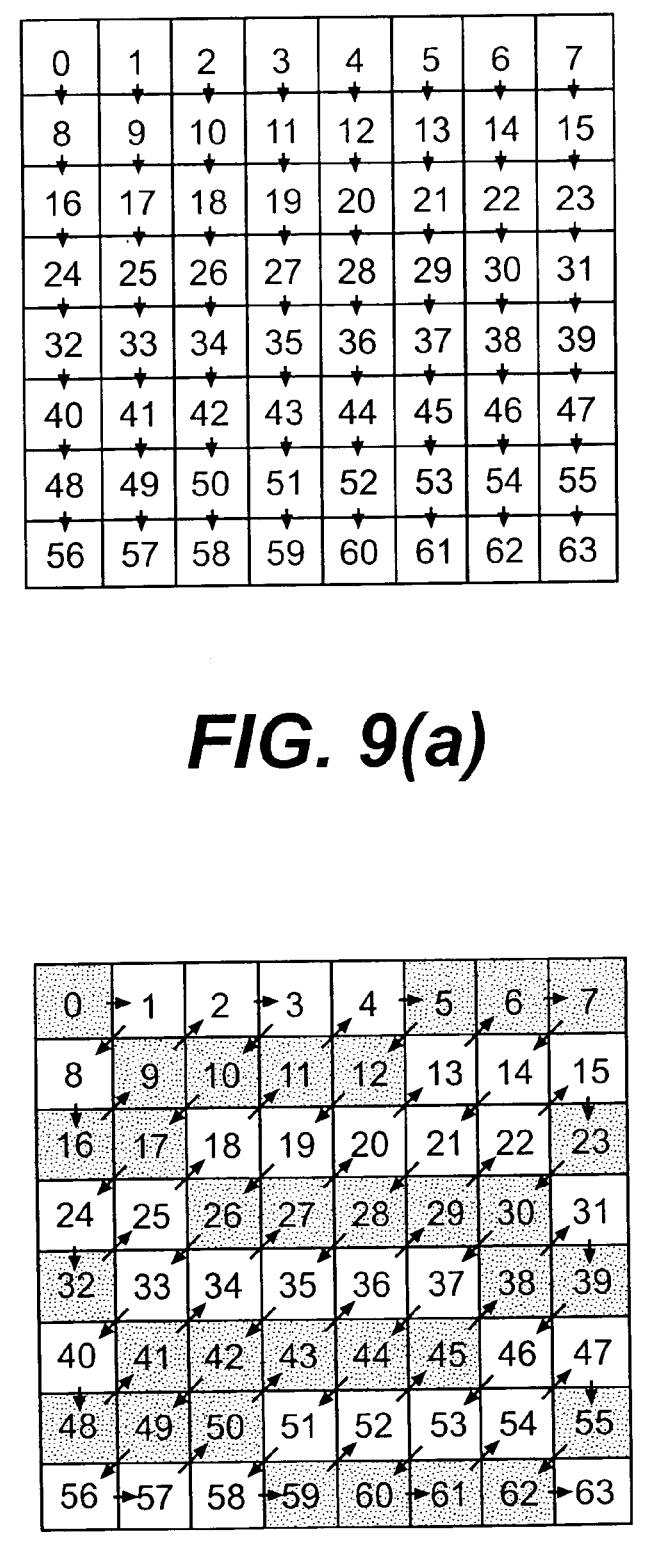

As shown in FIG. 9(a), 64 items of data are arranged in a 8×8 block in the row direction. Then, items of data in each column of the block are divided by twos in the column direction to generate sets of data each consisting of two items of data. Then, as shown in FIG. 9(b), the two items of data in each set are distributed among different first and second groups. In FIG. 9, data belonging to the first group are hatched, and data belonging to the second group are not hatched. In this case, the two items of data in each set are distributed among the first and second groups such that two consecutive items of data belong to different groups when the data of the block are scanned in the order of zigzag scan.

Next, as shown in FIG. 9(c), the positions of the two data in each set in the odd-numbered columns are switched each other. As a result, data of the first group are located in the odd-numbered rows, and data of the second group are located in the even-numbered rows. As shown in FIG. 9(d), the data of the first group in the odd-numbered rows are distributed to the memory 1, and the data of the second group in the even-numbered rows are written in the memory 2. In the figure, the addresses of the storage locations at the left ends of the memories 1 and 2 are "0", "8", "16" and "24" in the descending order.

By distributing data to the memories 1 and 2 in such a manner, two items of data consecutive in the order of raster scan in the column direction can be simultaneously written in the memories 1 and 2 respectively during a write, and two items of data consecutive in the order of zigzag scan can be simultaneously read from the memories 1 and 2 during a read.

Figure 10:
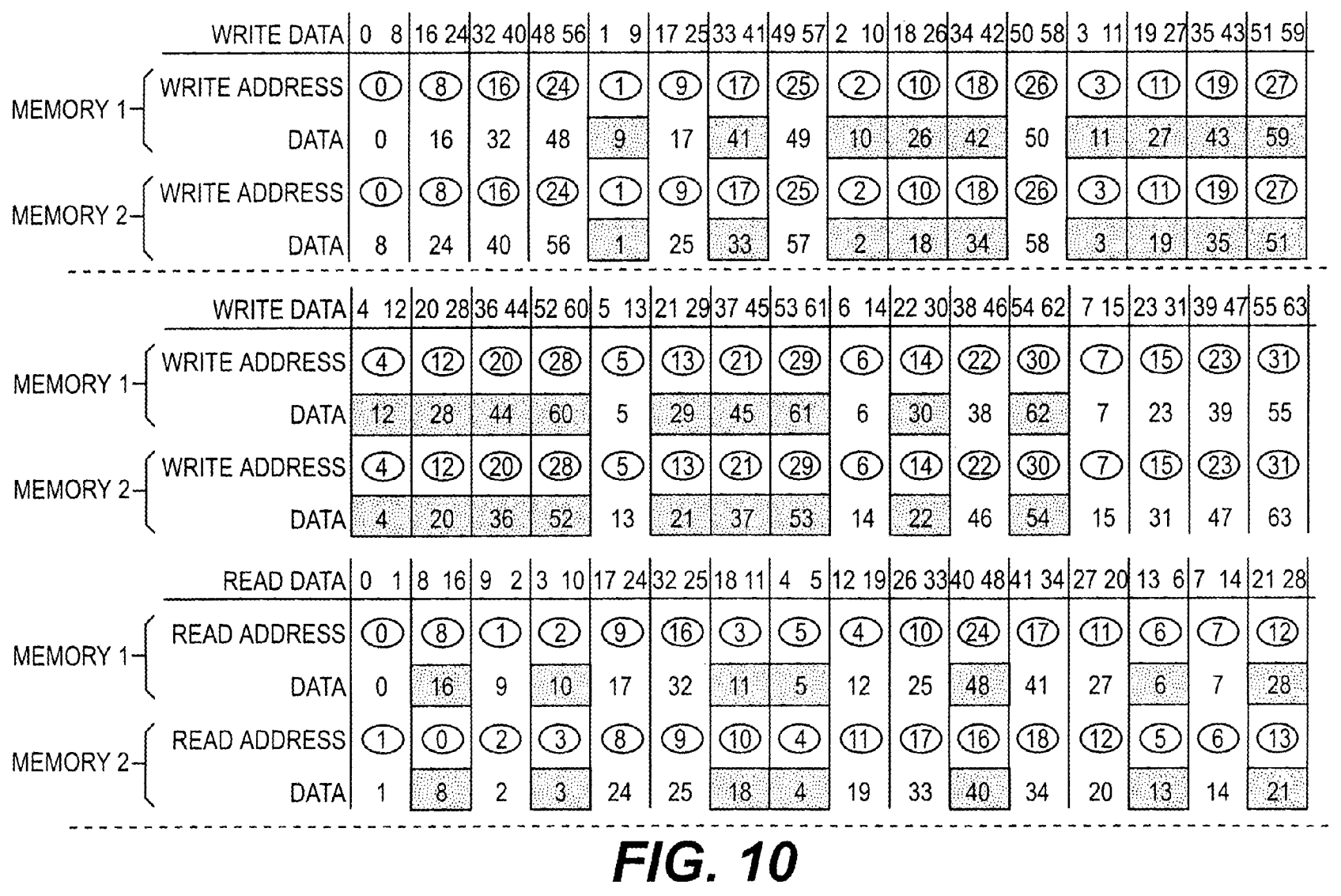
Figure 11:
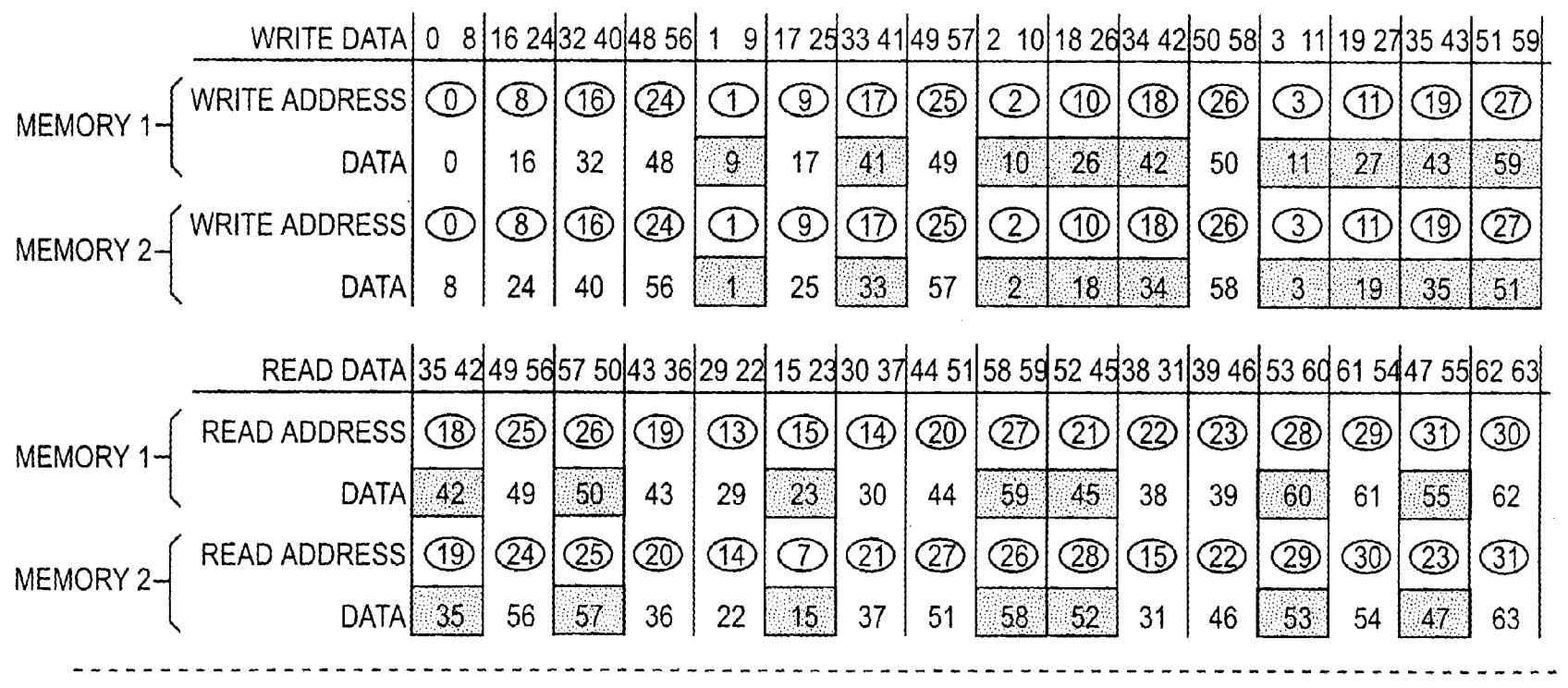

FIGS. 10 and 11 illustrate changes in the writing address, write data, reading address and read data in the second embodiment.

In the example in FIGS. 10 and 11, data are written in and read from the memories 1 and 2 concurrently, and a read of data in one block is started when 32 items of data in the block have been written.

As shown in FIGS. 10 and 11, when the writing address supplied to the memories 1 and 2 changes, two consecutive items of data are simultaneously written in the memories 1 and 2 in the order of raster scan in the column direction and, when the reading address supplied to the memories 1 and 2 changes, two consecutive items of data are simultaneously read from the memories 1 and 2 in the order of zigzag scan.

Thus, in the data processor of the second embodiment, two items of data consecutive in the order of raster scan or in the order of zigzag scan are simultaneously written in the memories 1 and 2 during a write, and two items of data consecutive in the order of zigzag scan or in the order of raster scan are simultaneously read from the memories 1 and 2 during a read, which makes it possible to increase the speed of data processing. Further, since 64 items of data can be simultaneously written and read in twos to and from the two memories 1 and 2 having 32 addresses, the size and cost of a system can be reduced.

FIG. 12 illustrates a method for distributing data of a block among four bank memories in which data of a block are shown at (a) and distribution of data is shown at (b).

In the example in FIG. 12, four items of data consecutive in the order of raster scan or in the order of zigzag scan can be simultaneously written in bank memories B0, B1, B2 and B3 during a write, and four items of data consecutive in the order of zigzag scan or in the order of raster scan can be simultaneously read from the bank memories B0, B1, B2 and B3 during a read. This makes it possible to reduce the size and cost of a system.

[Second Invention]

Figure 13:
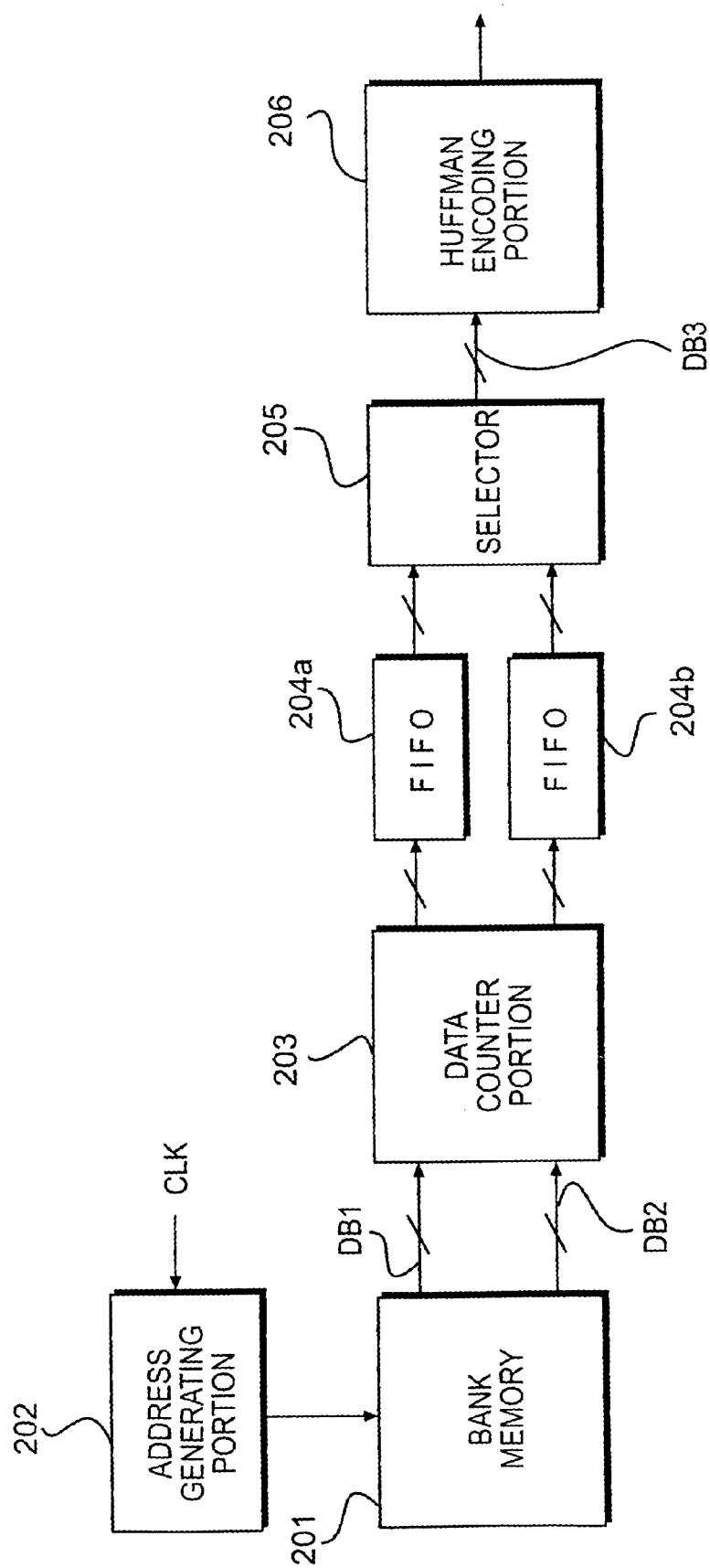
FIG. 13 is a block diagram showing a configuration of a Huffman encoder in a first embodiment of the second invention.

FIG. 13 is a block diagram showing a configuration of a Huffman encoder in a first embodiment of the second invention (hereinafter referred to as "third embodiment").

As shown in FIG. 13, the Huffman encoder includes a bank memory 201, an address generating portion 202, a data counter portion 203, FIFOs (first-in first-out memory) 204a and 204b, a selector 205 and a Huffman encoding portion 206.

Figure 18:
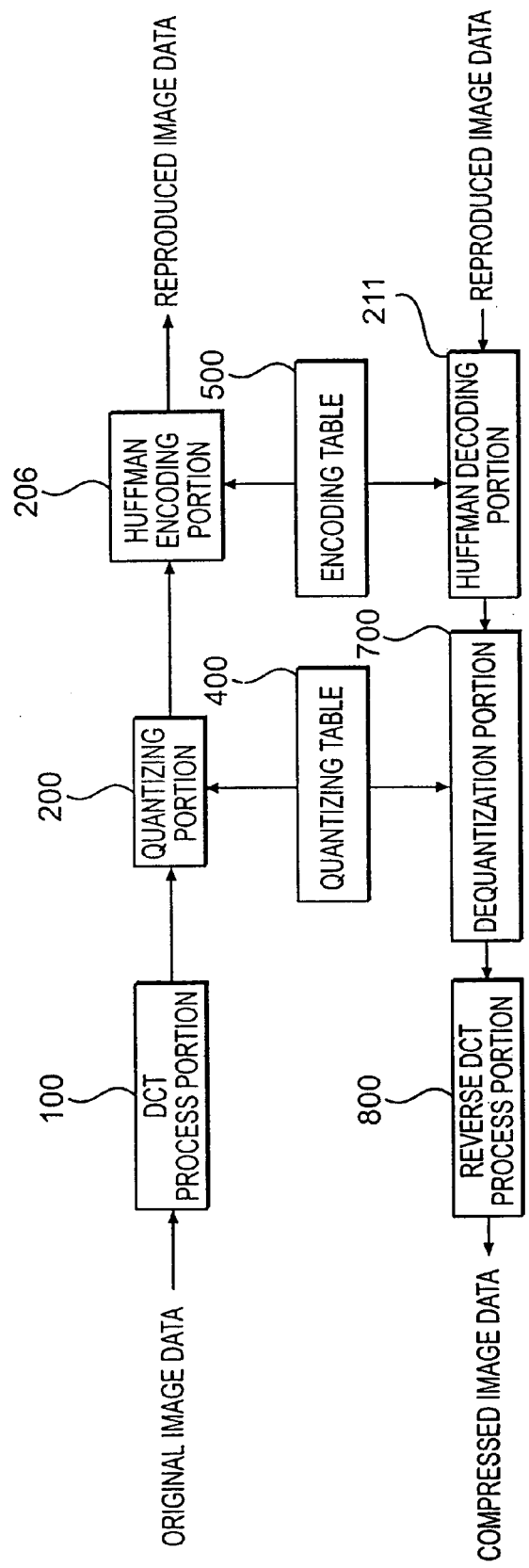
Figure 19:
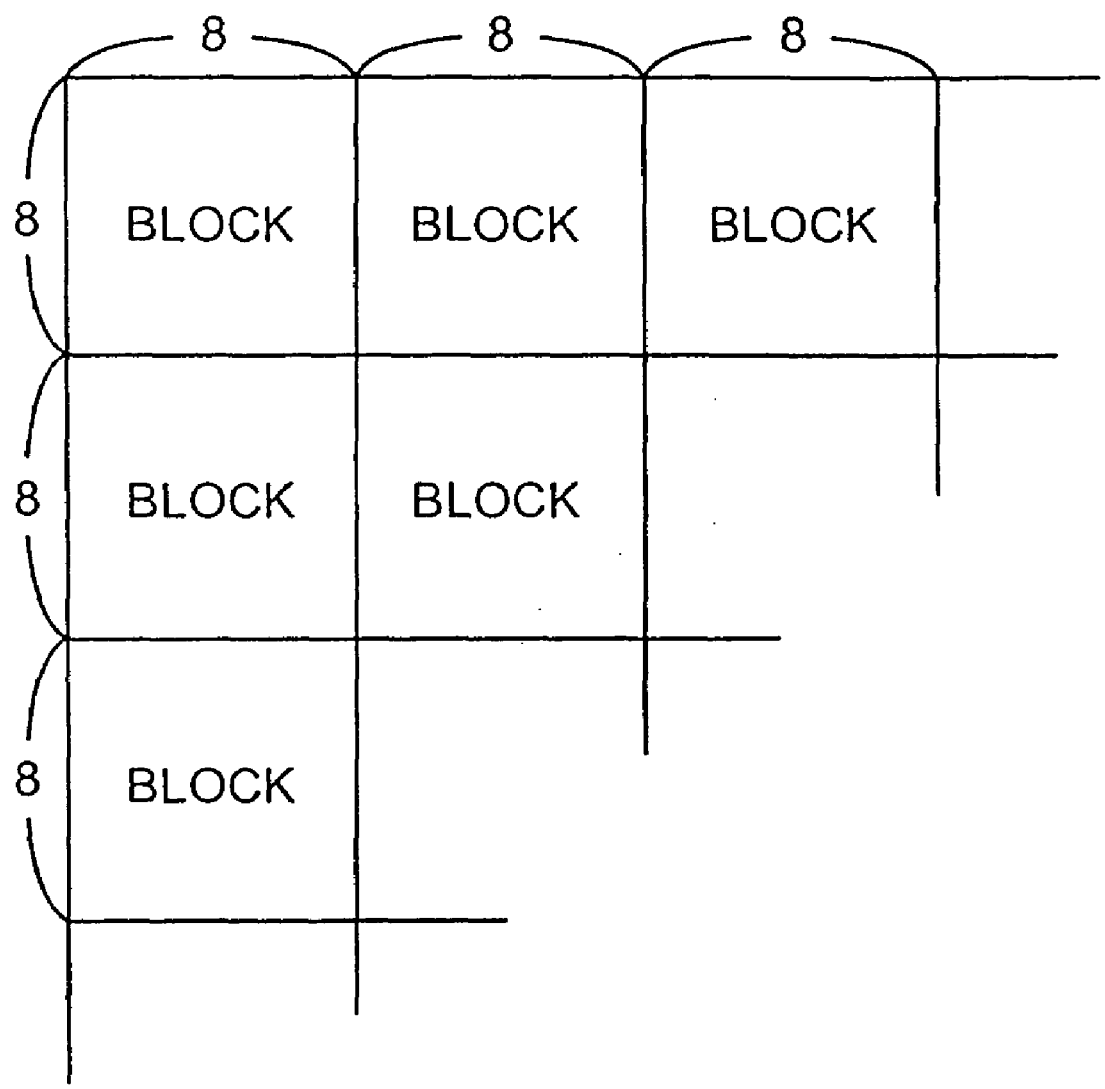
Figure 20:
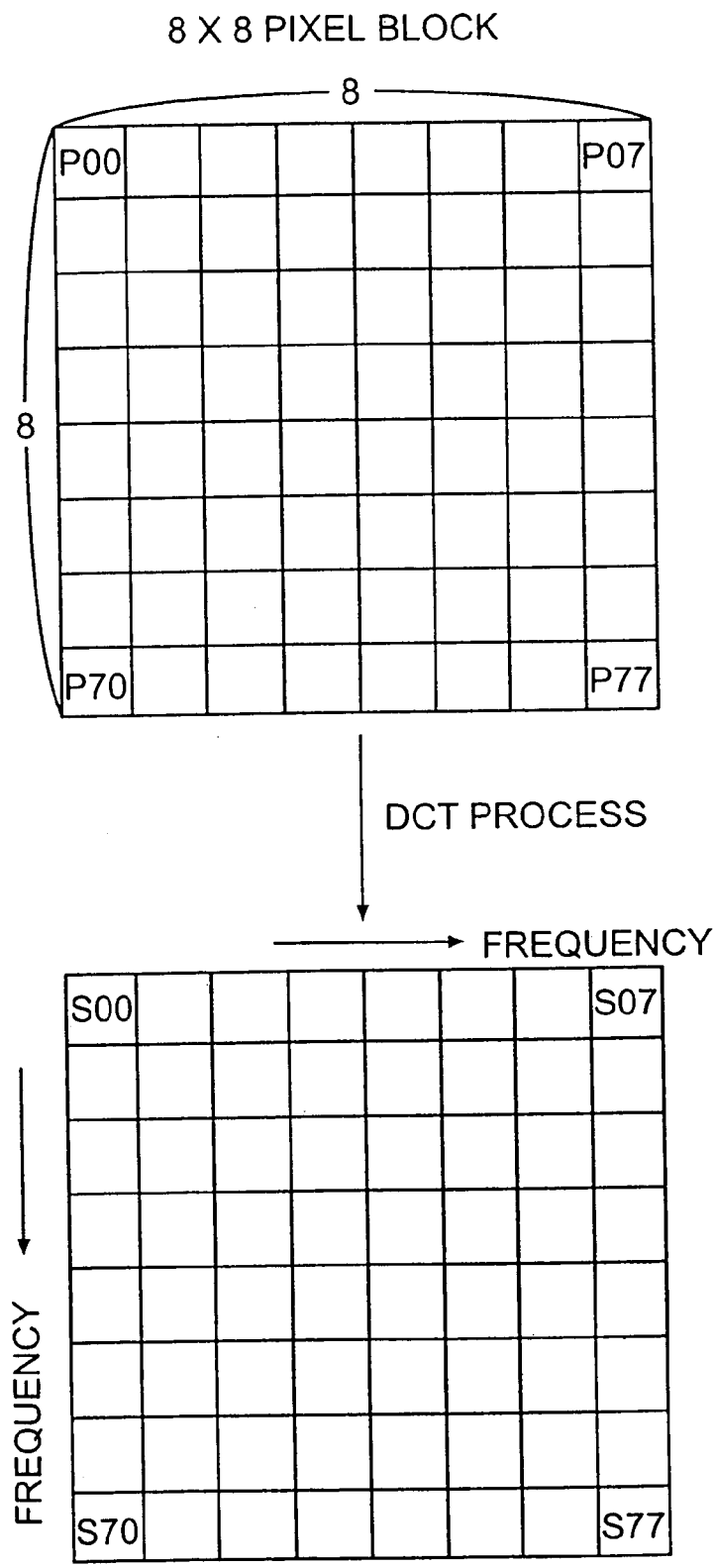
Figure 21:
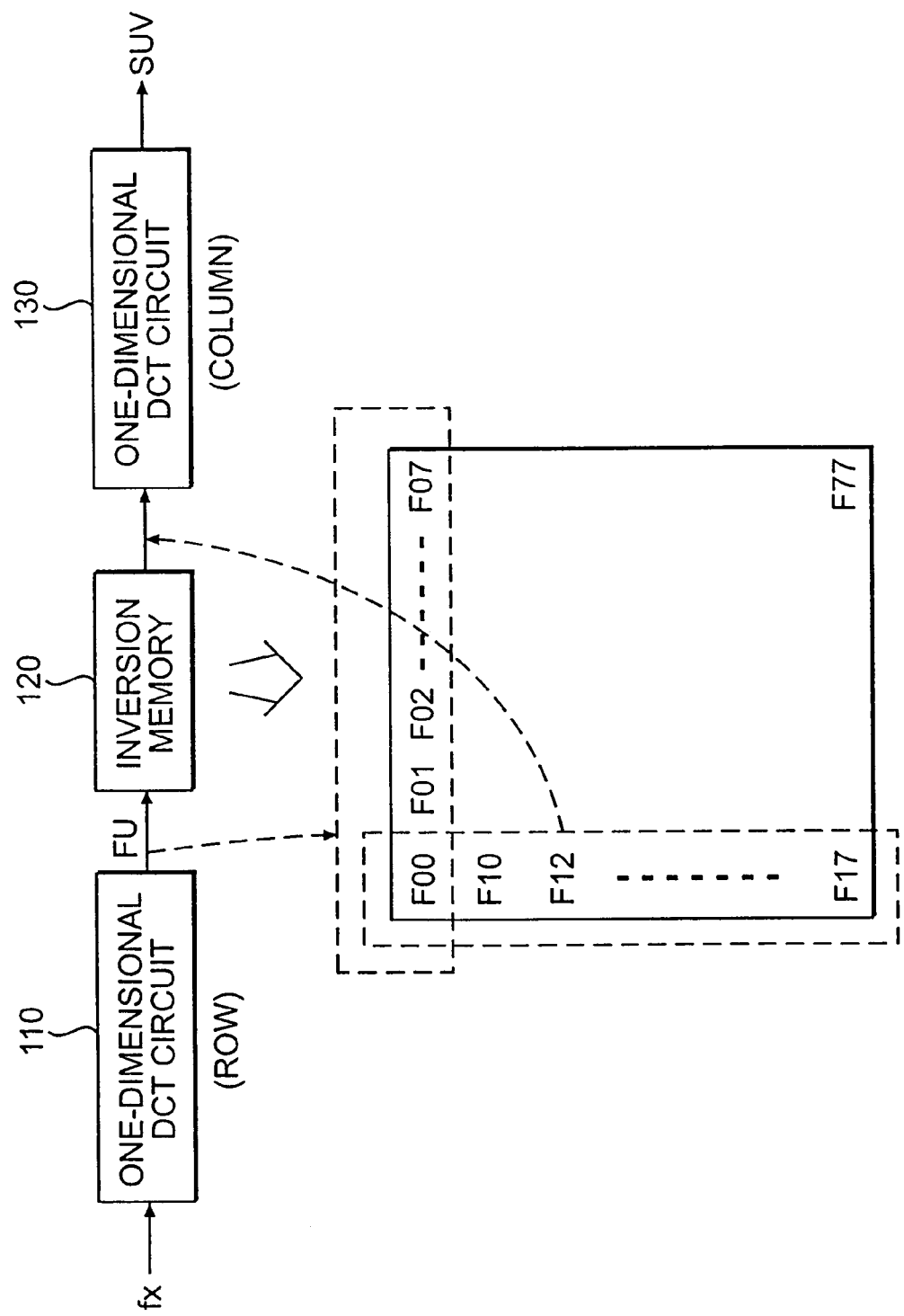
Figure 22:
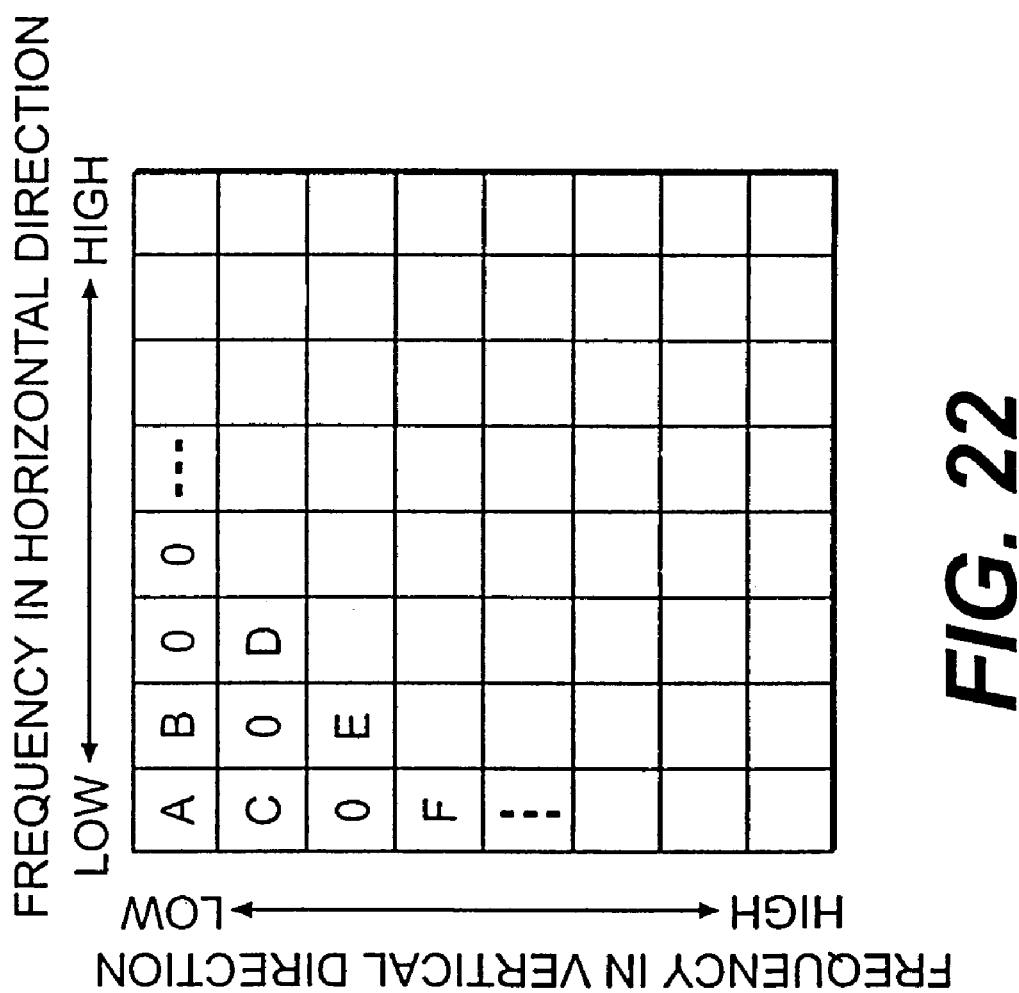
Figure 23:
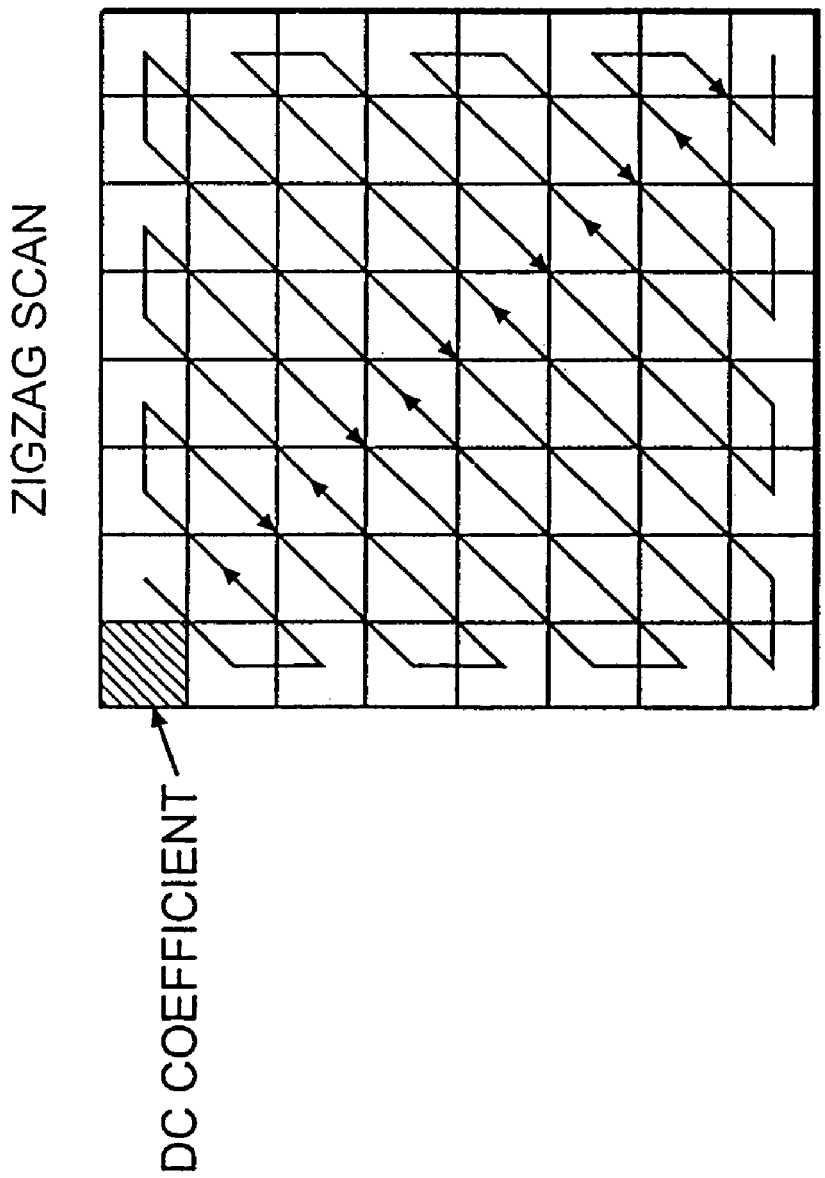
Figure 24A:
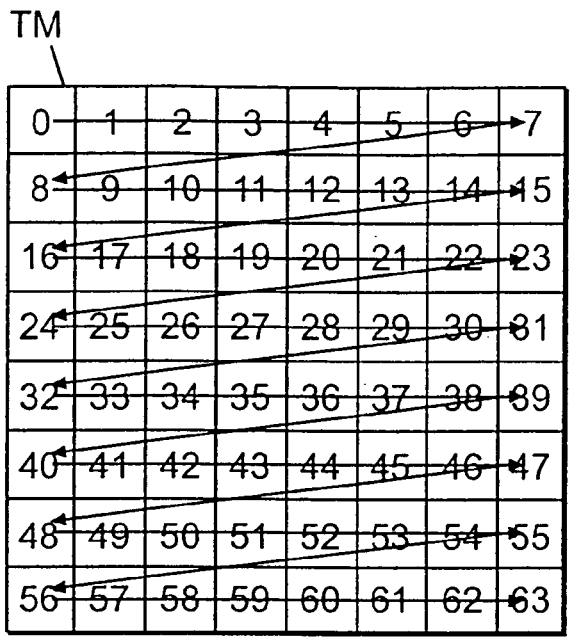
Figure 24B:
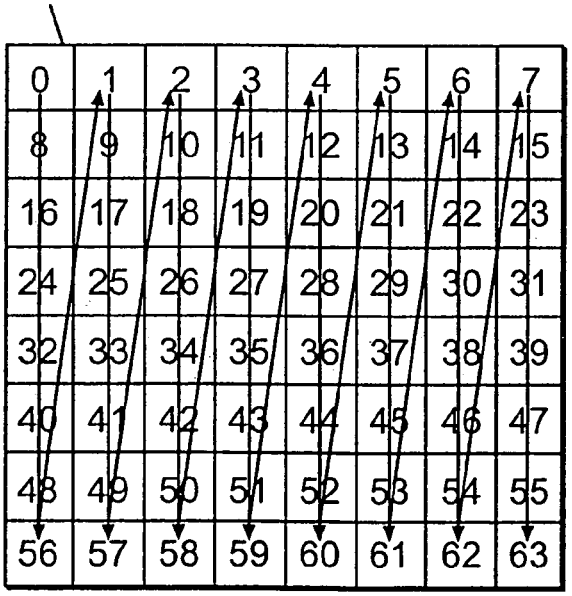
Figure 26:
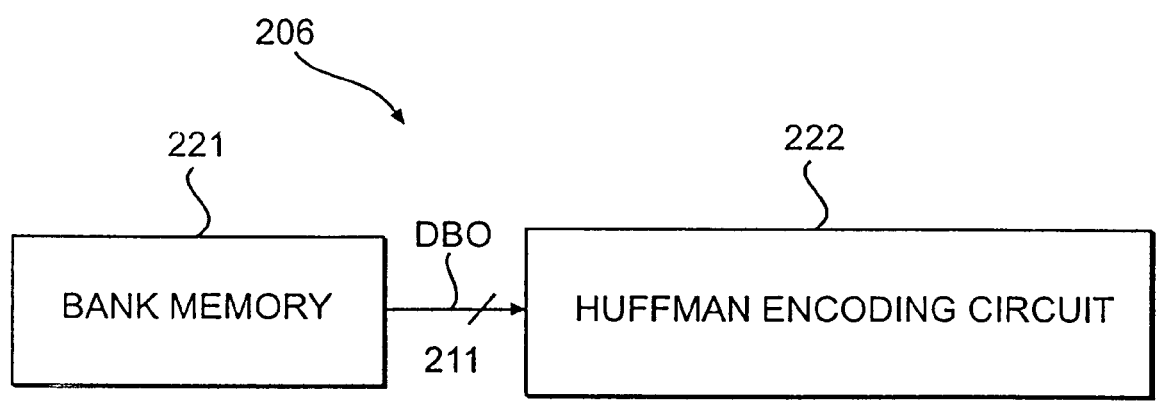
Figure 27:
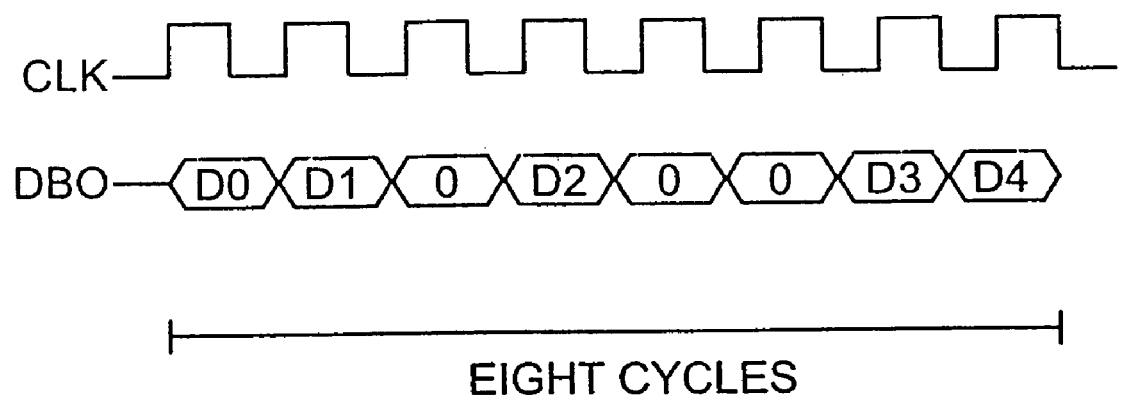
Figure 28:
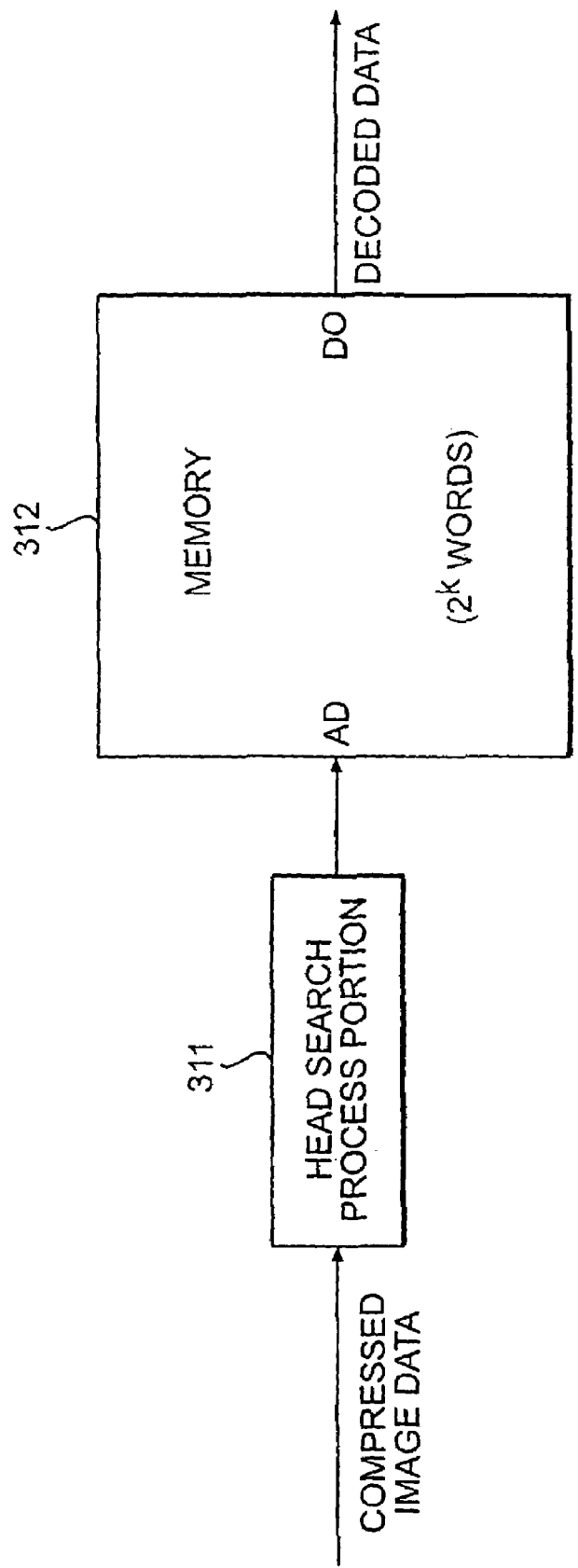

The bank memory 201 stores 8×8 quantized DCT coefficients output by a quantizing portion 200 (see FIG. 18) as data. The address generating portion 202 generates addresses for reading data from the bank memory 201 in the order of zigzag scan in synchronism with a clock signal CLK. Two items of data are stored in each address of the bank memory 201. As a result, two items of data can be simultaneously read at one clock of the clock signal CLK.

One of two items of data simultaneously read from the bank memory 201 is transferred to the data counter portion 203 through an 11-bit data bus DB1, and the other is transferred to the data counter portion 203 through an 11-bit data bus DB2.

The data counter portion 203 determines whether data supplied by the bank memory 201 is "0" (invalid coefficient). If the data is "0", it counts the number of consecutive "0s" until a valid coefficient (a coefficient other than "0") is supplied and writes a run length representing the number of consecutive "0s" and a valid coefficient, as a set of data, in the FIFOs 204a and 204b alternately. When both of two items of data supplied by the bank memory 201 are not "0", the data counter portion 203 sets the run length of each item of data at "0" and writes the run length and a valid coefficient in each of the FIFOs 204a and 204b as a set of data. The data written in the FIFOs 204a and 204b are sequentially shifted and output.

The selector 205 alternately selects data output by the FIFOs 204a and 204b and supplies them to the Huffman encoding portion 206 through a data bus DB3. The Huffman encoding portion 206 performs a Huffman encoding process based on data constituted by combinations of a run length and a valid coefficient supplied by the selector 205 during encoding of AC coefficients to output compressed image data including Huffman codes.

In the third embodiment, the bank memory 201 corresponds to the storage means; the address generating portion 202 corresponds to the read means; the data counter portion 203 corresponds to the counting means; and the Huffman encoding portion 206 corresponds to the encoding means. The FIFOs 204a and 204b correspond to the data storage means, and the selector 205 corresponds to the selection means.

A method for encoding of the third embodiment will now be described. The method for encoding of the third embodiment is characterized in that it includes the step of reading a plurality of DCT coefficients at a time, the step of transferring the plurality of DCT coefficients using a plurality of data paths respectively, the step of storing the transferred data respectively, the step of counting the number of consecutive invalid coefficients among the transferred DCT coefficients until a valid coefficient is encountered and the step of calculating data constituted by combinations of the number of consecutive invalid coefficients and a valid coefficient sequentially and performing a Huffman encoding process based on the calculated data and in that it generates Huffman codes.

The method for encoding will now be described in detail.

Figure 14:
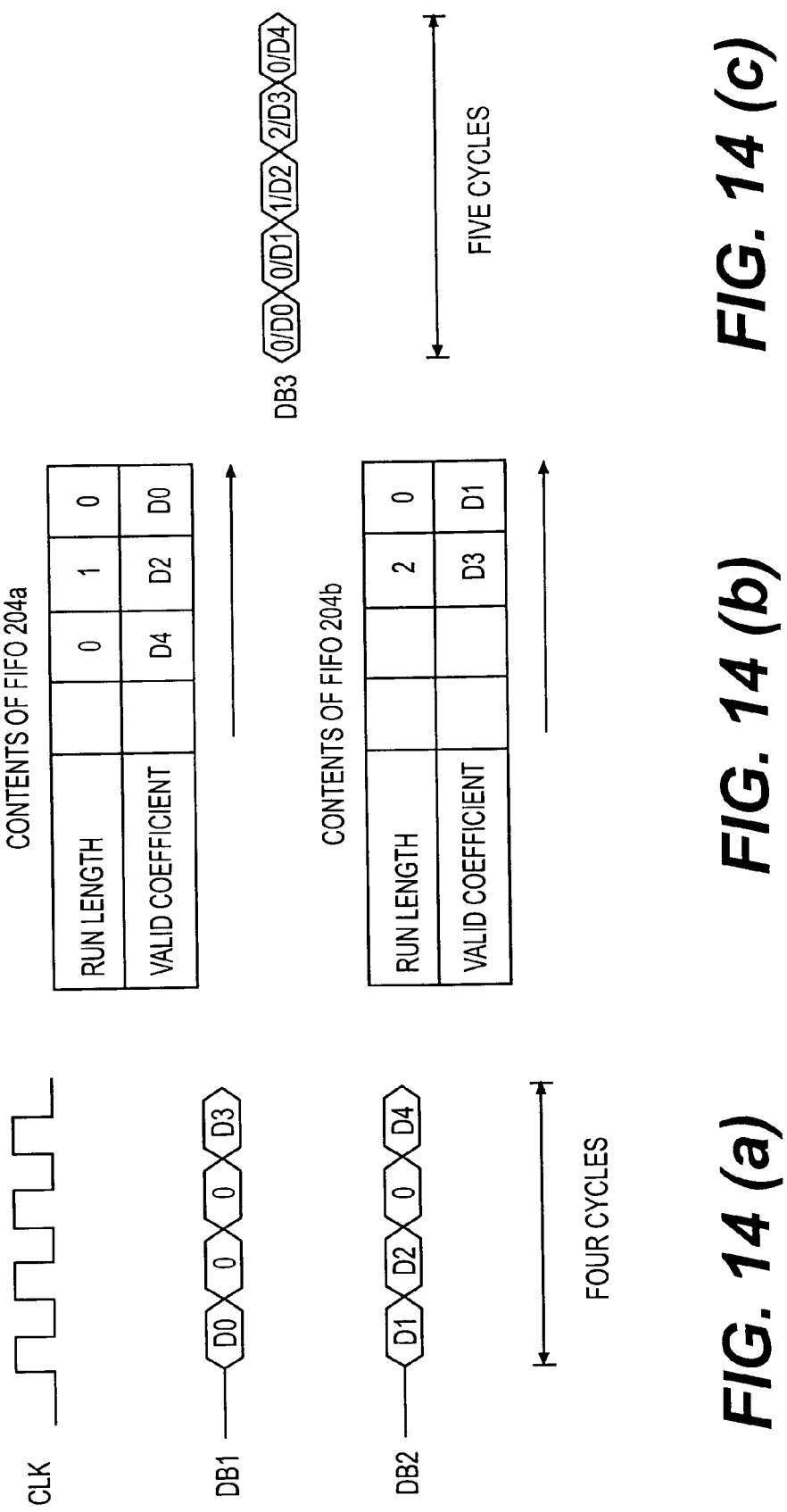

FIG. 14 is an illustration of an example of the method for Huffman encoding in FIG. 13 in which a clock signal CLK and data on the data buses DB1 and DB2 are shown at (a); the contents of the FIFOs 204a and 204b are shown at (b); and data on the data bus DB3 are shown at(c).

It is assumed here eight items of data are processed. Data of DCT coefficients "D0", "D1", "0", "D2", "0", "2", "D3" and "D4" are read from the bank memory 201 as a result of zigzag scan. The data "D0", "D1", "D2", "D3" and "D4" are valid coefficients, and "0" is an invalid coefficient.

As shown in FIG. 14(a), the data "D0" and "D1" are simultaneously read; the data "0" and "D2" are simultaneously read; the data "0" and "0" are simultaneously read; and the data "D3" and "D4" are simultaneously read. The data "D0", "0", "0" and "D3" are transferred to the data counter portion 203 through the data bus DB1, and the data "D1", "D2", "0" and "D4" are transferred to the data counter portion 203 through the data bus DB2. The time required for the transfer of the eight items of data from the bank memory 201 to the data counter portion 203 corresponds to four cycles of the clock signal CLK.

Since the data "D0" supplied through the data bus DB1 is a valid coefficient and the data "D1" supplied through the data bus DB2 is also a valid coefficient, the data counter portion 203 writes a run length "0" and a valid coefficient "D0" in the FIFO 204a as a set of data and writes a run length "0" and a valid coefficient "D1" in the FIFO 204b as a set of data.

Next, since the data supplied through the data bus DB1 is "0", the data counter portion 203 counts a run length "1" and, since the data "D2" supplied through the data bus DB2 is a valid coefficient, it writes a run length "1" and a valid coefficient "D2" in the FIFO 204a as a set of data.

Then, since the data supplied through the data bus DB1 is "0", the data counter portion 203 counts a run length "1" and, since the data supplied through the data bus DB2 is "0", it counts a run length "2". Next, since the data "D3" supplied through the data bus DB1 is a valid coefficient and the data "D4" supplied through the data bus DB2 is a valid coefficient, the data counter portion 203 writes a run length "2" and a valid coefficient "D3" in the FIFO 204b as a set of data and a run length "0" and a valid coefficient "D4" in the FIFO 204a as a set of data.

As a result, as shown in FIG. 14(b), "0/D0", "1/D2" and "0/D4" are sequentially written in the FIFO 204a as run lengths/valid coefficients, and "0/D1" and "2/D3" are sequentially written in the FIFO 204b as run lengths/valid coefficients.

The selector 205 alternately selects data output from the FIFOs 204a and 204b and transfers them to the Huffman encoding portion 206 through the data bus DB3. As a result, as shown in FIG. 14(c), data "0/D0", "0/D1", "1/D2", "2/D3" and "0/D4" representing combinations of a run length and a valid coefficient are sequentially supplied to the Huffman encoding portion 206. In this case, the time required for the transfer of the data from the selector 205 to the Huffman encoding portion 206 corresponds to five cycles of the clock signal CLK.

Thus, the transfer of eight items of data from the bank memory 201 to the data counter portion 203 is performed in four cycles, and the transfer of data from the selector 205 to the Huffman encoding portion 206 is performed in five cycles. Therefore, in the above example, eight items of data can be processed in five cycles.

In the Huffman encoder and the method for encoding in the third embodiment, since two items of data are simultaneously transferred from the bank memory 201 to the data counter portion 203, the number of cycles required for the transfer of data from the bank memory 201 to the data counter portion 203 is reduced. Further, the number of data output by the selector 205 is reduced when "0s" consecutively exit in data read from the bank memory 201, which reduces the number of cycles required for the transfer of data from the selector 205 to the Huffman encoding portion 206 and the processing load of the Huffman encoding portion 206. In the third embodiment, the minimum number of cycles required for processing data is one half that in a conventional Huffman encoder. This makes it possible to increase the processing speed of a Huffman encoder and hence the performance of the same.

While the third embodiment has referred to a case in which the width of the data bus from the bank memory 201 to the data counter portion 203 is as large as twice that in the prior art and in which two items of data are simultaneously read from the bank memory 201, a configuration may be employed in which the width of the data bus from the bank memory 201 to the data counter portion 203 is as large as $N_B$ times that in the prior art and in which $N_B$ items of data are simultaneously read from the bank memory 201. Here, $N_B$ is any integer. In this case, the minimum number of cycles required for processing data is one-$N_B$th that in the conventional Huffman encoder and method for encoding.

Figure 15:
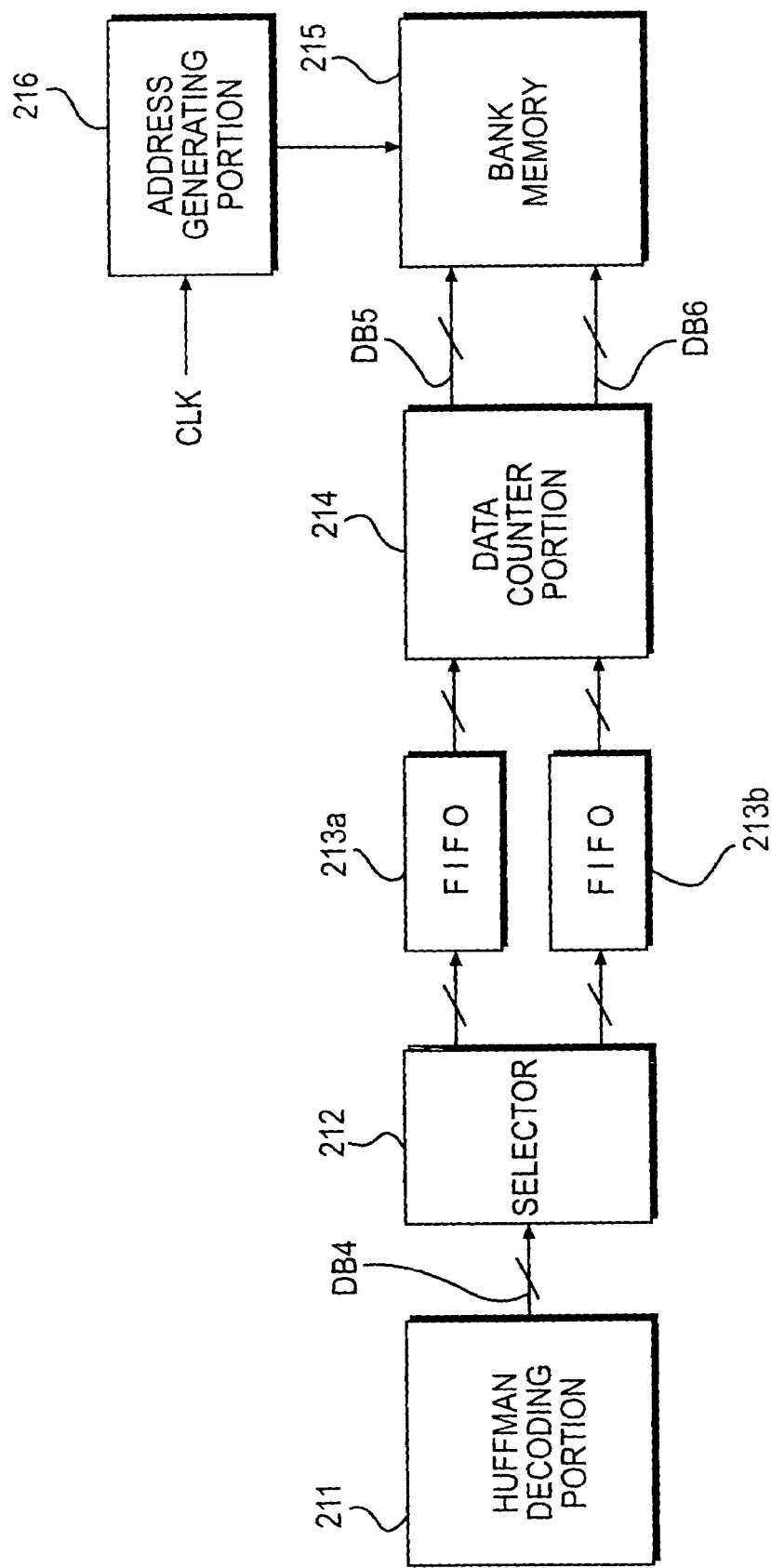
FIG. 15 is a block diagram showing a configuration of a Huffman decoder in a second embodiment of the second invention.

FIG. 15 is a block diagram showing a configuration of a Huffman decoder in a second embodiment of the second invention (hereinafter referred to as "fourth embodiment").

As shown in FIG. 15, the Huffman decoder includes a Huffman decoding portion 211, a selector 212, FIFOs 213a and 213b, a data counter portion 214, a bank memory 215 and an address generating portion 216.

During decoding of AC coefficients, the Huffman decoding portion 211 performs a Huffman decoding process on Huffman codes included in compressed image data and transfers data constituted by combinations of a run length and a valid coefficient to the selector 212 through a data bus DB4. The selector 212 alternately writes the data supplied by the Huffman decoding portion 211 in the FIFOs 213a and 213b. The data written in the FIFOs 213a and 213b are sequentially shifted and output.

The data counter portion 214 generates a quantized DCT coefficient based on the run length and valid coefficient of each item of data supplied by the FIFOs 213a and 213b and simultaneously outputs DCT coefficients thus generated in twos.

One of two items of data simultaneously output by the data counter portion 214 is transferred to the bank memory 215 through an 11-bit data bus DB5, and the other is transferred to the bank memory 215 through an 11-bit data bus DB6.

The address generating portion 216 generates addresses for writing data in the bank memory 215 in the order of zigzag scan in synchronism with a clock signal CLK. In this case, items of data are written in each address of the bank memory 215 in twos. As a result, two items of data can be simultaneously written at one clock of the clock signal CLK. The bank memory 215 stores 8×8 quantized DCT coefficients supplied by the data counter portion 214 as data. The data stored in the bank memory 215 are supplied to a dequantization portion 700 (see FIG. 18).

In the fourth embodiment, the Huffman decoding portion 211 corresponds to the decoding means; the data counter portion 214 corresponds to the generation means; the bank memory 215 corresponds to the storage means; and the address generating portion 216 corresponds to the write means. The selector 212 corresponds to the selection means, and the FIFOs 213a and 213b correspond to the data storage means.

In the Huffman decoder and method for decoding of the fourth embodiment, the processing is carried out in a way which is the reverse of that in the Huffman encoding and method for encoding of the third embodiment. When run lengths have large values, the number of items of data output by the Huffman decoding portion 211 becomes small, which reduces the number of cycles required for the transfer of data from the Huffman decoding portion 211 to the selector 205 and the processing load of the Huffman decoding portion 211. Further, since two items of data are simultaneously transferred from the data counter portion 214 to the bank memory 215, the number of cycles required for the transfer of data from the data counter portion 214 to the bank memory 215 is reduced. In the fourth embodiment, the minimum number of cycles required for processing data is one half that in a conventional Huffman decoder and method for decoding. This increases the speed of a Huffman decoding process, thereby providing improved performance.

While the fourth embodiment has referred to a case in which the width of the data bus from the data counter portion 214 to the bank memory 215 is enlarged by a factor of two and in which two items of data are simultaneously written in the bank memory 215, a configuration may be employed in which the width of the data bus from the data counter portion 214 to the bank memory 215 is enlarged by a factor of $N_B$ and in which $N_B$ items of data are simultaneously written in bank memory 215. In this case, the minimum number of cycles required for processing data is one-$N_B$th that in the conventional Huffman decoder and method for decoding.

[Third Invention]

Figure 16:
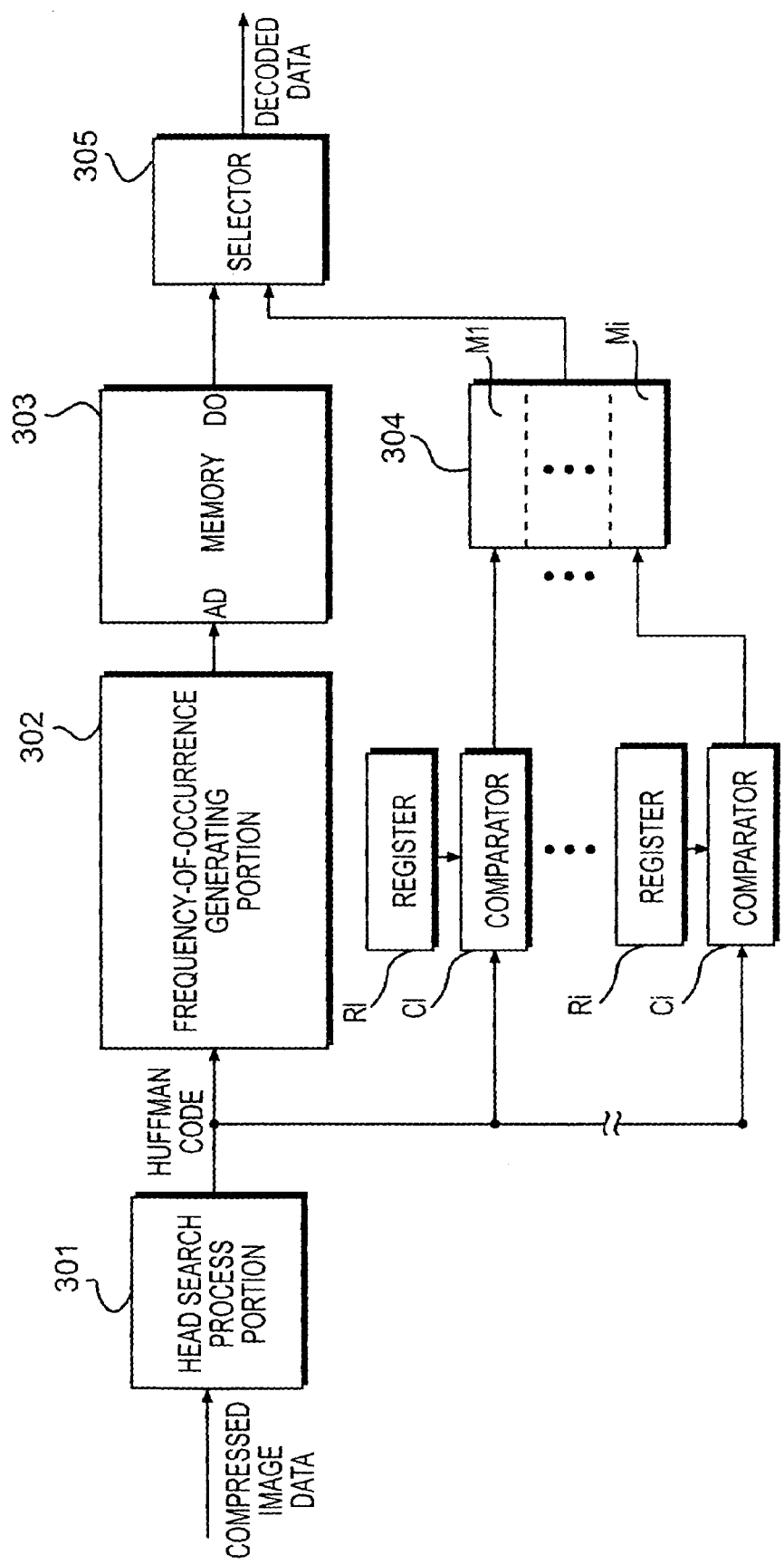
FIG. 16 is a block diagram showing a configuration of a Huffman decoder in an embodiment of the third invention.

FIG. 16 is a block diagram showing a configuration of a Huffman decoder in an embodiment of the third invention (hereinafter referred to as "fifth embodiment").

The Huffman decoder in shown in FIG. 16 includes a head search process portion 301, a frequency-of-occurrence generating portion 302, a memory 303, i units of registers R1 through Ri, i units of comparators C1 through Ci, a register 304 and a selector 305. If it is assumed here that there are n Huffman codes, i satisfies a relationship of 0<i<N. In the fifth embodiment, i=20. In the fifth embodiment, the maximum code length k of Huffman codes is 16 bits. Normally, the shorter the code length of a Huffman code, the higher the frequency of occurrence of the same. For example, Huffman codes in the first through twentieth places in the frequency of occurrence have a code length of 8 bits or less.

The head search process portion 301 detects the position of the head of each Huffman code from compressed image data input thereto, supplies 16 bits of compressed image data counted from the detected head position to the frequency-of-occurrence generating portion 302 and supplies 8 bits of compressed image data counted from the detected head position to the comparators C1 through Ci.

The frequency-of-occurrence generating portion 302 generates the frequencies of occurrence of Huffman codes included in the compressed image data supplied by the head search process portion 301 according to a method as described later and supplies the generated frequencies of occurrence to an address input terminal AD of the memory 303 as address signals.

A RAM (random access memory) or the like is used as the memory 303. In each address of the memory 303, decoded data associated with a Huffman code having a frequency of occurrence indicated by the address is stored. Decoded data is constituted by a run length (the number of consecutive 0s) and a group number. Huffman codes and frequencies of occurrence correspond to each other in a one-to-one relationship, and frequencies of occurrence and decoded data correspond to each other in a one-to-one relationship. Therefore, up to N items of decoded data are stored in the memory 303.

When a frequency of occurrence is supplied to the address input terminal AD of the memory 303 as an address signal, decoded data associated with a Huffman code that occurs in that frequency is output from a data output terminal D0.

In the i units of registers R1 through Ri, i Huffman codes which are in the first through i-th places in the frequency of occurrence are respectively stored. The comparators C1 through Ci are provided in association with the respective registers R1 through Ri. The comparators C1 through Ci compare Huffman codes included in compressed image data supplied by the head search process portion 301 with Huffman codes stored in the respective registers R1 through Ri. When the Huffman codes supplied by the head search process portion 301 match the Huffman codes stored in the respective registers R1 through Ri, the comparators C1 through Ci output a match signal, for example, at a high level and when not matched output a mismatch signal, for example, at a low level.

The register 304 has i storage areas M1 through Mi in association with the registers R1 through Ri. In the storage areas M1 through Mi of the register 304, decoded data associated with the Huffman codes in the first through i-th places in the frequency of occurrence are respectively stored. Each item of the decoded data is constituted by a run length and a group number.

The selector 305 selectively outputs decoded data output by the memory 303 or decoded data output by the register 304.

In the fifth embodiment, the registers R1 through Ri correspond to the first storage means; the comparators C1 through Ci correspond to the match detection means; and the register 304 corresponds to the second storage means. The frequency-of-occurrence generating portion 302 corresponds to the frequency-of-occurrence generating means, the memory 303 corresponds to the third storage means and the selector 305 corresponds to the selection means.

Figure 17:
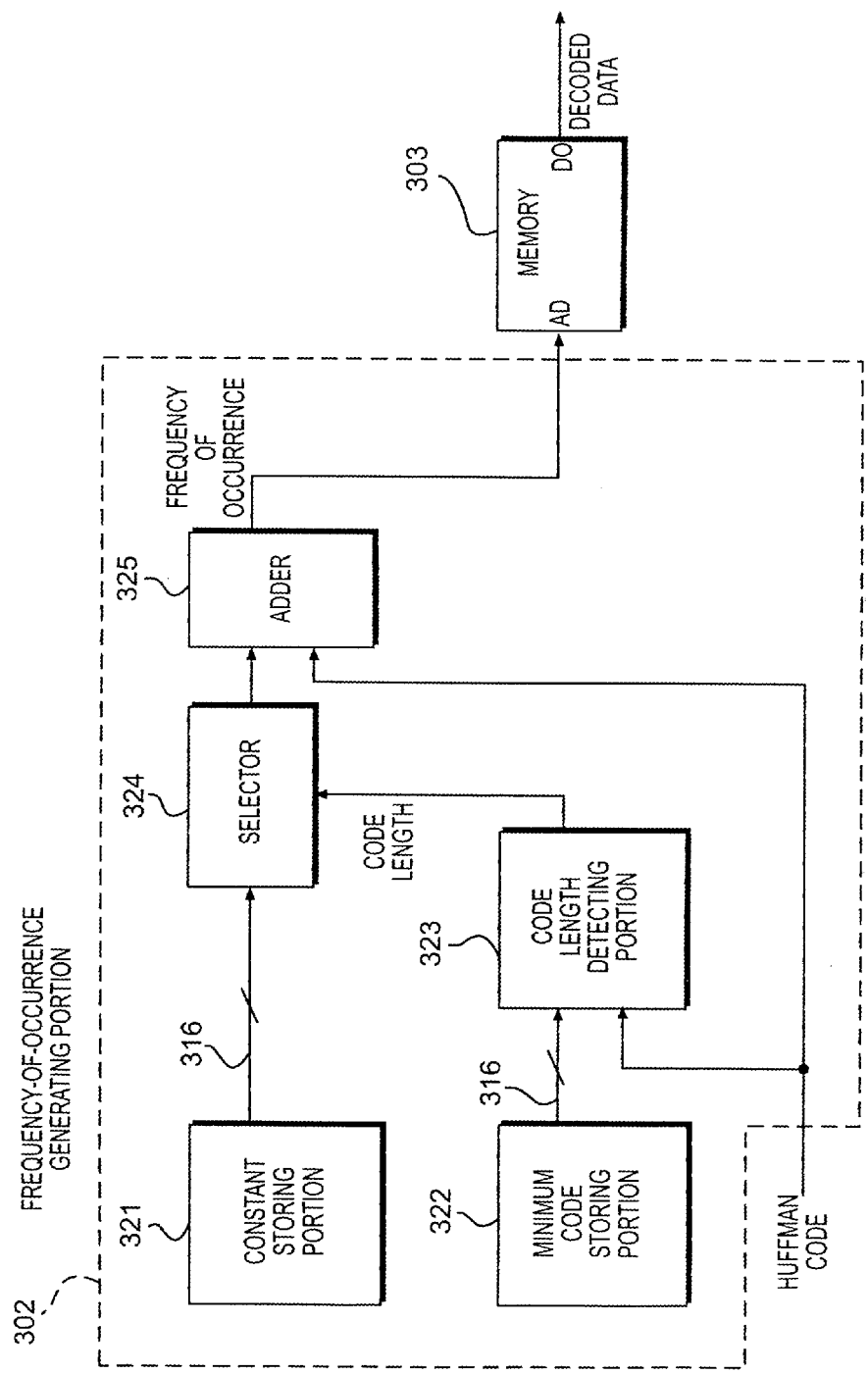
FIG. 17 is a block diagram showing a configuration of a frequency-of-occurrence generation portion included in the Huffman decoder in FIG. 16.

FIG. 17 is a block diagram showing a configuration of the frequency-of-occurrence generating portion 302 of the Huffman decoder in FIG. 16.

The frequency-of-occurrence generating portion 302 includes a constant storing portion 321, a minimum code storing portion 322, a code length detecting portion 323, a selector 324 and an adder 325. A Huffman code and a frequency of occurrence satisfy the following relational expression.

Frequency of occurrence=Huffman code−constant $M_X$

A constant $M_X$ is specific to the code length of a Huffman code and can be obtained through a calculation in advance. It is therefore possible to calculate the frequency of occurrence of an input Huffman code by detecting the code length thereof and using the constant $M_X$ associated with the detected code length.

Constants $M_X$ associated with code lengths of 1 bit through 16 bits are stored in the constant storing portion 321 in FIG. 17. For example, the constant storing portion 321 is constituted by a register.

A minimum code for each of code lengths of Huffman codes is stored in the minimum code storing portion 322. Specifically, the minimum code storing portion 322 stores 16 minimum codes in total from a minimum code for Huffman codes with a code length of 1 bit up to a minimum code for Huffman codes with a code length of 16 bits. For example, if there are three Huffman codes with a code length of 4 bits, i.e., "1010", "1011" and "1100", "1010" is stored in the minimum code storing portion 322 as a minimum code for the Huffman codes with a code length of 4 bits. For example, the minimum code storing portion 322 is constituted by a register.

The code length detecting portion 323 detects the code length of a Huffman code input thereto by comparing the input Huffman code with 16 Huffman codes output by the minimum code storing portion 322.

The selector 324 selects one of 16 constants $M_X$ output by the constant storing portion 321 based on the code length detected by the code length detecting portion 323 and supplies the selected constant $M_X$ to one of input terminals of the adder 325. The input Huffman code is supplied to the other input terminal of the adder 325.

The adder 325 calculates a frequency of occurrence by subtracting the constant $M_X$ from the input Huffman code and supplies the calculated frequency of occurrence to the address input terminal AD of the memory 303 as an address signal. As a result, decoded data constituted by a run length and a group number associated therewith is output from the data output terminal D0 of the memory 303.

In the fifth embodiment, the constant storing portion 321 corresponds to the constant storing means; the minimum code storing portion 322 corresponds to the minimum code storing means; and the code length detecting portion 323 corresponds to the code length detection means. The selector 324 corresponds to the constant selection means, and the adder 325 corresponds to the calculation means.

A method for Huffman decoding of the fifth embodiment will now be described.

The method for Huffman decoding of the fifth embodiment includes the step of storing a predetermined number of Huffman codes among a plurality of Huffman codes respectively, the step of storing a predetermined number of decoded data associated with said predetermined number of Huffman codes respectively, detecting match between a Huffman code input thereto and said stored Huffman codes and outputting any of said predetermined number of decoded data in response to said match detection signal, the step of storing the decoded data in an address indicated by the frequency of occurrence of at least the plurality of remaining Huffman codes among said plurality of Huffman codes and generating a frequency of occurrence associated therewith based on the input Huffman code and the step of receiving said frequency of occurrence as an address signal and outputting decoded data from an address specified by the address signal.

The method for decoding will now be described in detail.

The head search process portion 301 detects the position of the head of each Huffman code included in compressed image data, supplies 16 bits of compressed image data counted from the detected head position to the frequency-of-occurrence generating portion 302 and supplies 8 bits of compressed image data counted from the detected head position to the having the number of I comparators C1 through Ci.

The comparators C1 through Ci compare Huffman codes included in the compressed image data supplied by the head search process portion 301 with Huffman codes stored in the respective registers R1 through Ri. When the Huffman codes supplied by the head search process portion 301 match any of the i Huffman codes stored in the registers R1 through Ri, any of the comparators C1 through Ci outputs a match signal, for example, at a high level, and a mismatch signal, for example, at a low level is output by the other comparators.

The signals output by the comparators C1 through Ci are supplied to the register 304 as address signals. As a result, decoded data is output from a storage area among the storage areas M1 through Mi of the register 304 which is associated with the comparator that has output a match signal.

In this case, the comparators C1 through Ci and the registers R1 through Ri output decoded data in one cycle of a reference signal.

When a Huffman code included in compressed image data supplied by the head search process portion 301 does not match any of the Huffman codes stored in the registers R1 through Ri, a frequency of occurrence is output by the frequency-of-occurrence generating portion 302 based on the Huffman code included in the compressed image data.

The frequency of occurrence output by the frequency-of-occurrence generating portion 302 is supplied to the address input terminal AD of the memory 303 as address signals. As a result, decoded data associated with a Huffman code having such a frequency of occurrence is output from the data output terminal D0 of the memory 303.

In this case, the frequency-of-occurrence generating portion 302 and the memory 303 output decoded data in three cycles of a reference signal.

When the Huffman code supplied by the head search process portion 301 is a Huffman code having a frequency of occurrence which is equal to or higher than the i-th place, the selector 305 outputs the decoded data output by the register 304 and, when the Huffman code supplied by the head search process portion 301 is not a Huffman code having a frequency of occurrence which is equal to or higher than the i-th place, the selector 305 outputs the decoded data output by the memory 303.

Since a Huffman code having a frequency of occurrence in any of the first through twentieth places occurs with a probability of about 90% or more, about 90% of Huffman codes supplied by the head search process portion 301 are decoded in the process in one cycle at the comparators C1 through Ci and register 304. Therefore, the processing speed of the Huffman decoder as a whole is increased.

Since there is one-to-one correspondence between Huffman codes and frequencies of occurrence and between frequencies of occurrence and decoded data, the maximum storage capacity required for the memory 303 is N words which is the same quantity as that of Huffman codes. Therefore, the Huffman decoder can be made compact.

While Huffman codes with frequencies of occurrence in the first through twentieth places among a plurality of Huffman codes are stored in the registers R1 through Ri in the fifth embodiment, the number of Huffman codes stored in the registers R1 through Ri is not limited thereto, and any number of Huffman codes may be stored in the registers.

While decoded data associated with all Huffman codes are stored in the memory 303 in the fifth embodiment, decoded data associated with Huffman codes excluding i Huffman codes stored in the registers R1 through Ri may be stored in the memory 303.

All of the modes of carrying out the invention disclosed here should be regarded as examples and not limiting the invention in all aspects.

Specifically, the encoding means is not limited to a Huffman encoding portion; the decoding means is not limited to a Huffman decoding portion; the data storage means is not limited to a bank memory or register; the data storage means is not limited to an FIFO; and the data transfer means is not limited to a data bus.

INDUSTRIAL APPLICABILITY

As described above, an image data processor according to the invention makes it possible to rearrange data at a high speed and to achieve a reduced size and cost. Further, encoding and decoding can be performed with efficiency higher than in the prior art at a process of encoding image data or a process of decoding data with codes having a variable length which are image processing steps that must be especially performed at a high speed. The present invention also makes it possible to decode input data at a speed higher than that in the prior art without increasing the circuit scale of image processing means.

Thus, the invention makes a great contribution to efforts toward decoding of codes at higher speeds without increasing the scale of a circuit and has a wide range of application in fields related to image processing.

What is claimed is:

1. A Huffman encoder encoding DCT coefficients into Huffman codes, comprising:
   a first storage that stores a plurality of DCT coefficients;
   a reader that reads a plurality of the DCT coefficients stored in said first storage at a time;
   a counter that counts the number of consecutive invalid coefficients until a valid coefficient is encountered in the DCT coefficients read by said reader from said first storage to sequentially output data constituted by combinations of the number of consecutive invalid coefficients and a valid coefficient;
   a plurality of second storages that respectively store data sequentially output from said counter and output the same in the order of input;
   a selector that sequentially selects any of the data respectively stored in output from said plurality of second storages and outputs the same; and
   an encoder that performs a Huffman encoding process based on the data sequentially output from said selector to generate Huffman codes.

2. A Huffman encoder for encoding DCT coefficients into Huffman codes, comprising:
   a storage that stores a plurality of DCT coefficients;
   a reader that reads a plurality of the DCT coefficients stored in said storage in parallel;
   a plurality of data buses that respectively transfer a plurality of the DCT coefficients read by said reader from said storage in parallel;
   a plurality of data storages that store input data and output the same in the order of input;
   a counter that counts the number of consecutive invalid coefficients until a valid coefficient is encountered in the DCT coefficients transferred through said plurality of data buses in parallel to sequentially input data constituted by combinations of the number of consecutive invalid coefficients and a valid coefficient to said plurality of data storages;
   a selector that sequentially selects any of the data respectively output from said plurality of data storages and outputs the same; and
   an encoder that performs a Huffman encoding process based on the data output from said selector to generate Huffman codes.

3. A Huffman decoder for decoding Huffman codes into DCT coefficients, comprising:
   a decoder that performs a Huffman decoding process on input Huffman codes to sequentially output data constituted by combinations of the number of consecutive invalid coefficients and a valid coefficient;
   a plurality of first storages that respectively store data;
   a selector that sequentially selects any of the data output from said decoder and sequentially writes the same in said plurality of first storage;
   a generator that is provided in common to said plurality of first storages, generates DCT coefficients based on the data stored in said plurality of first storages and outputs a plurality of the generated DCT coefficients at a time;
   a second storage that stores a plurality of DCT coefficients; and
   a writer that writes a plurality of the DCT coefficients output from said generator in said second storage at a time.

4. A Huffman decoder for decoding Huffman codes into DCT coefficients, comprising:
   a decoder that performs a Huffman decoding process on input Huffman codes to sequentially output data constituted by combinations of the number of consecutive invalid coefficients and a valid coefficient;
   a plurality of data storage that store input data and output the same in the order of input;
   a selector that selects any of the data output from said decoder and sequentially inputs the same to said plurality of data storages;
   a generator that is provided in common to said plurality of data storages, generates DCT coefficients based on the data output from said plurality of data storages and outputs a plurality of the generated DCT coefficients in parallel;
   a plurality of data buses that respectively transfer said plurality of the DCT coefficients output by said generator in parallel;
   a storage that stores a plurality of DCT coefficients; and
   a writer that writes a plurality of the DCT coefficients transferred through said plurality of data buses in said storage in parallel.

5. A method of Huffman encoding for encoding DCT coefficients into Huffman codes, comprising the steps of:
   storing a plurality of DCT coefficients in a first storage;
   reading a plurality of the DCT coefficients stored in said first storage at a time;
   counting the number of consecutive invalid coefficients until a valid coefficient is encountered in the DCT coefficients read from said first storage and sequentially outputting data constituted by combinations of the number of consecutive invalid coefficients and a valid coefficient;
   storing the sequentially output data in a plurality of second storages respectively and outputting the same in the order of input;

sequentially selecting any of the data respectively output from said plurality of second storages and outputting the same; and performing a Huffman encoding process based on the sequentially output data to generate Huffman codes.

6. A method of Huffman encoding for encoding DCT coefficients into Huffman codes, comprising the steps of:

storing a plurality of DCT coefficients in a storage;

reading a plurality of the DCT coefficients stored in said storage in parallel;

transferring said plurality of the DCT coefficients read from said storage through a plurality of data buses respectively in parallel;

counting the number of consecutive invalid coefficients until a valid coefficient is encountered in the DCT coefficients transferred through said plurality of data buses and sequentially inputting data constituted by combinations of the number of consecutive invalid coefficients and a valid coefficient to a plurality of data storages sequentially;

outputting the data from said plurality of data storages in the order of input;

sequentially selecting any of the data output from said plurality of data storages and outputting the same; and performing a Huffman encoding process based on the output data to generate Huffman codes.

7. A method of Huffman decoding for decoding Huffman codes into DCT coefficients, comprising the steps of:

performing a Huffman decoding process on input Huffman codes to sequentially output data constituted by combinations of the number of consecutive invalid coefficients and a valid coefficient;

selecting any of the output data and sequentially writing the same in a plurality of first storages;

generating, in common to said plurality of first storages, DCT coefficients based on the data stored in said plurality of first storages and outputting a plurality of the generated DCT coefficients at a time; and writing said plurality of the output DCT coefficients in a storage at a time.

8. A method of Huffman decoding for decoding Huffman codes into DCT coefficients, comprising the steps of:

performing a Huffman decoding process on input Huffman codes to sequentially output data constituted by combinations of the number of consecutive invalid coefficients and a valid coefficient;

selecting any of said output data and sequentially inputting the same in a plurality of data storages;

outputting the data from said plurality of data storages in the order of input;

generating, in common to said plurality of data storages, DCT coefficients based on the data output from said plurality of data storages and outputting a plurality of the generated DCT coefficients in parallel;

respectively transferring said plurality of the output DCT coefficients in parallel through a plurality of data buses respectively; and writing said plurality of the DCT coefficients transferred through said plurality of data buses respectively in a storage in parallel.

9. A Huffman decoder for decoding Huffman codes input thereto to output decoded data, characterized in that it comprises:

a plurality of first storage means for respectively storing a predetermined number of Huffman codes among a plurality of Huffman codes;

a plurality of match detection means provided in association with said plurality of first storage means for detecting match between an input Huffman code and the Huffman codes stored in the first storage means associated therewith;

second storage means for storing a predetermined number of decoded data associated with said predetermined number of Huffman codes respectively and for outputting any of said predetermined number of decoded data in response to a signal output by said plurality of match detection means;

frequency-of-occurrence generating means for generating a frequency of occurrence based on a Huffman code input thereto; and third storage means for storing decoded data in an address indicated by the frequency of occurrence of at least the plurality of remaining Huffman codes among said plurality of Huffman codes, receiving the frequency of occurrence generated by said frequency-of-occurrence generating means as an address signal and outputting decoded data from an address specified by the address signal.

10. The Huffman decoder according to claim 9, characterized in that said predetermined number of Huffman codes have frequencies of occurrence higher than those of the remaining Huffman codes.

11. The Huffman decoder according to claim 9, characterized in that said frequency-of-occurrence generating means includes:

constant storing means for storing a constant set for each code length of Huffman codes;

minimum code storing means for storing a minimum code for each code length of the Huffman codes;

code length detection means for detecting the code length of a Huffman code input thereto based on the minimum code for each code length stored in said minimum code storing means;

constant selection means for selecting any of the constants stored in said constant storing means based on the code length detected by said code length detection means; and calculation means for calculating a frequency of occurrence based on the constant selected by said constant selection means and the input Huffman code.

12. A Huffman decoder according to claim 9, characterized in that it further comprises decoded data selecting means or selectively outputting decoded data output by said second and third storage means.

13. A method for Huffman decoding for decoding Huffman codes to output decoded data, characterized in that it comprises the steps of:

storing a predetermined number of Huffman codes among a plurality of Huffman codes respectively;

storing a predetermined number of decoded data associated with said predetermined number of Huffman codes respectively;

detecting match between an input Huffman code and said stored Huffman codes associated therewith;

outputting any of said predetermined number of decoded data in response to said match detection signal;

storing decoded data in an address indicated by the frequency of occurrence of at least the plurality of remaining Huffman codes among said plurality of Huffman codes;

generating a frequency of occurrence based on the input Huffman code;

receiving said frequency of occurrence as an address signal; and outputting decoded data from an address specified by said address signal.

14. A method for Huffman decoding according to claim 13, characterized in that said predetermined number of Huffman codes have frequencies of occurrence higher than those of the remaining Huffman codes.

15. A method for Huffman decoding according to claim 13, characterized in that said step of generating a frequency of occurrence includes the steps of:

storing a constant set for each code length of Huffman codes;

storing a minimum code for each code length of the Huffman codes;

detecting the code length of an input Huffman code based on said stored minimum code for each code length;

selecting any of the stored constants based on said detected code length; and generating a frequency of occurrence based on the selected constant and the input Huffman code.

16. A method for Huffman decoding according to claim 13, characterized in that the output decoded data are selectively output.

* * * * *